US012062087B2

(12) United States Patent
Kemper et al.

(10) Patent No.: US 12,062,087 B2
(45) Date of Patent: Aug. 13, 2024

(54) DYNAMIC DISCOUNTING SYSTEM AND METHOD

(71) Applicant: POLLEN, INC, Leawood, KS (US)

(72) Inventors: Alexander C. Kemper, Kansas City, MO (US); Roy E. Owens, Lake Quivira, KS (US); George Wesley Hedrick, Lee's Summit, MO (US); Peter Thomas, Kansas City, MO (US); Patricia Iorio, Lee's Summit, MO (US); John G. Christopher, Kansas City, KS (US); Douglas A. Martin, Kansas City, MO (US)

(73) Assignee: POLLEN, INC., Leawood, KS (US)

( * ) Notice: Subject to any disclaimer, the term of this patent is extended or adjusted under 35 U.S.C. 154(b) by 0 days.

(21) Appl. No.: 17/080,026

(22) Filed: Oct. 26, 2020

(65) Prior Publication Data

US 2021/0042821 A1    Feb. 11, 2021

Related U.S. Application Data

(63) Continuation of application No. 12/262,477, filed on Oct. 31, 2008, now Pat. No. 10,817,932.

(51) Int. Cl.
*G06Q 40/02* (2023.01)
*G06Q 30/0207* (2023.01)
(Continued)

(52) U.S. Cl.
CPC ......... *G06Q 40/02* (2013.01); *G06Q 30/0207* (2013.01); *G06Q 30/08* (2013.01); *G06Q 40/04* (2013.01)

(58) Field of Classification Search
CPC ........ G06Q 40/02; G06Q 40/04; G06Q 30/08; G06Q 30/0207
(Continued)

(56) References Cited

U.S. PATENT DOCUMENTS 6,161,099 A   12/2000   Harrington et al.
6,167,385 A   12/2000   Hartley-Urquhart
(Continued)

FOREIGN PATENT DOCUMENTS

KR   10-2000-0059187 A   10/2000
KR   10-2001-0025313 A   4/2001
WO      2008/005712 A2   1/2008

OTHER PUBLICATIONS

"Discounting Turns Dynamic", PayStream Analyst, Purchase to Payment, Retrieved from Internet URL : http://www.paystreamvoices.com/index.php?tag=dynamic-discount-management, accessed on Jun. 16, 2008, p. 5 (Nov. 1, 2007).
(Continued)

*Primary Examiner* — Matthew S Gart
*Assistant Examiner* — Liz P Nguyen
(74) *Attorney, Agent, or Firm* — Shook, Hardy & Bacon L.L.P.

(57) ABSTRACT

A system and method for dynamically discounting trade debt through the use of a forward auction is provided. In one example, a system that allows a seller to auction inventory to a plurality of bidders. According to this embodiment, the system may determine eligibility for acceptance of bids submitted by the bidders and a plurality of bids may be determined to be eligible for acceptance. Further, a margin by which the bids are acceptable may be determined and a representation of the margin may be communicated. In another example, a method is provided for discounting debt using an auction system. According to this embodiment, a seller may configure an auction event with auction parameters, such as hurdle rates, that will best serve the goals of the auction. The seller may alter event parameters while the event is ongoing, thus further enhancing the ability of the seller to meet auction objectives.

20 Claims, 16 Drawing Sheets

(51) Int. Cl.
*G06Q 30/08* (2012.01)
*G06Q 40/04* (2012.01)

(58) Field of Classification Search
USPC .......................................................... 705/37
See application file for complete search history.

(56) References Cited

U.S. PATENT DOCUMENTS

| | | | |
|---|---|---|---|
| 6,202,051 | B1 | 3/2001 | Woolston |
| 7,096,197 | B2 | 8/2006 | Messmer et al. |
| 7,136,833 | B1 * | 11/2006 | Podsiadlo .............. G06Q 30/08 |
| | | | 705/37 |
| 7,219,080 | B1 | 5/2007 | Wagoner et al. |
| 7,398,229 | B2 | 7/2008 | Budish |
| 7,593,380 | B1 | 9/2009 | Ferguson et al. |
| 10,417,708 | B2 | 9/2019 | Smith et al. |
| 10,817,932 | B2 | 10/2020 | Kemper et al. |
| 2002/0032621 | A1 | 3/2002 | Smith et al. |
| 2002/0042769 | A1 | 4/2002 | Gujral et al. |
| 2002/0082985 | A1 | 6/2002 | MacKay |
| 2002/0099643 | A1 | 7/2002 | Abeshouse et al. |
| 2003/0018563 | A1 | 1/2003 | Kilgour et al. |
| 2003/0041010 | A1 | 2/2003 | Yonao-Cowan |
| 2003/0220863 | A1 | 11/2003 | Holm et al. |
| 2004/0049449 | A1 | 3/2004 | Martinelli |
| 2004/0059665 | A1 | 3/2004 | Suri et al. |
| 2004/0073510 | A1 | 4/2004 | Logan |
| 2004/0122736 | A1 | 6/2004 | Strock et al. |
| 2005/0021756 | A1 | 1/2005 | Grant |
| 2006/0224496 | A1 | 10/2006 | Sandholm et al. |
| 2007/0083457 | A1 | 4/2007 | Evelyn et al. |
| 2008/0027853 | A1 | 1/2008 | Neubert |
| 2008/0133399 | A1 | 6/2008 | Rupp et al. |
| 2008/0162285 | A1 * | 7/2008 | Tulloch .............. G06Q 30/0234 |
| | | | 705/37 |
| 2008/0195525 | A1 * | 8/2008 | Orgad .................... G06Q 40/04 |
| | | | 705/37 |
| 2009/0030829 | A1 | 1/2009 | Chatter et al. |
| 2009/0043678 | A1 * | 2/2009 | Bizri .................... G06Q 20/102 |
| | | | 705/30 |
| 2009/0094406 | A1 | 4/2009 | Ashwood |
| 2010/0114676 | A1 | 5/2010 | Kemper et al. |
| 2011/0197133 | A1 | 8/2011 | Tarjan et al. |
| 2012/0116944 | A1 | 5/2012 | DiCarlo |
| 2018/0000064 | A1 | 1/2018 | Roessler |

OTHER PUBLICATIONS

Canadian Office Action received for Canadian Patent Application No. 2,840,864, mailed on Jan. 27, 2022, 7 pages.
Non-Final Office Action dated Feb. 16, 2022 in U.S. Appl. No. 13/175,287, 8 pages.
Non-Final Office Action dated Jul. 27, 2021 in U.S. Appl. No. 13/175,287, 9 pages.
Notice of Allowance received for Canadian Patent Application No. 2840864, mailed on Feb. 27, 2023, 1 page.
Non-Final Office Action dated Mar. 26, 2021 in U.S. Appl. No. 13/175,287, 7 pages.
Office Action received for Canadian Patent Application No. 2840864, mailed on Apr. 29, 2021, 4 pages.
Final Office Action dated Aug. 26, 2022 in U.S. Appl. No. 13/175,287, 10 pages.

* cited by examiner

Figure 8:
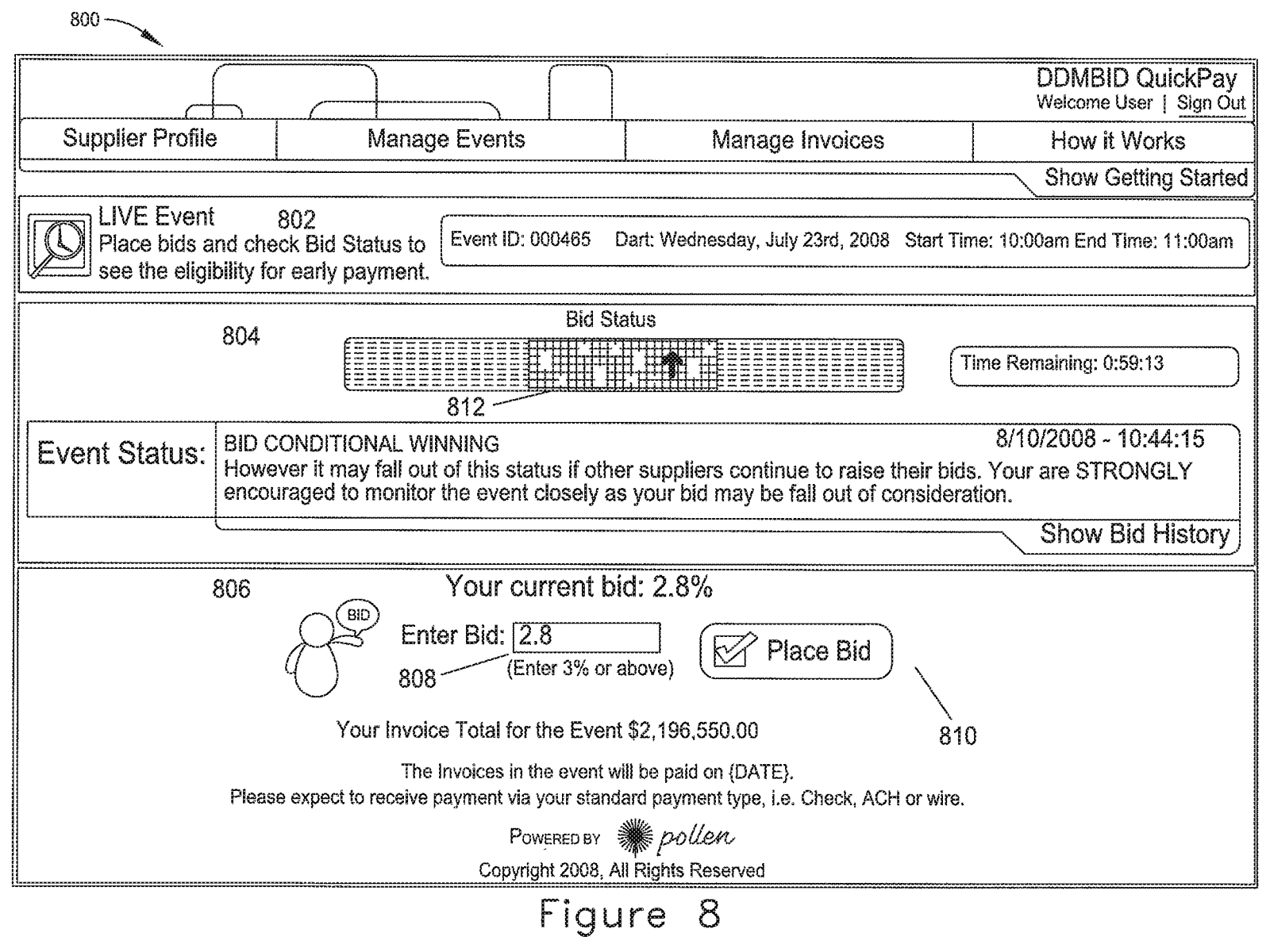

| Supplier Profile | Manage Events | Manage Invoices | DDMBID QuickPay |
| --- | --- | --- | --- |

Welcome User | Sign Out

How it Works

Show Getting Started

LIVE Event 802
Place bids and check Bid Status to see the eligibility for early payment.

Event ID: 000465    Dart: Wednesday, July 23rd, 2008    Start Time: 10:00am End Time: 11:00am Bid Status Time Remaining: 0:59:13

804

812

Event Status: BID CONDITIONAL WINNING
However it may fall out of this status if other suppliers continue to raise their bids. Your are STRONGLY encouraged to monitor the event closely as your bid may be fall out of consideration.

8/10/2008 - 10:44:15

Show Bid History

Your current bid: 2.8%

806

Enter Bid: 2.8    ☑ Place Bid    810
808  (Enter 3% or above)

Your Invoice Total for the Event $2,196,550.00

The Invoices in the event will be paid on (DATE).
Please expect to receive payment via your standard payment type, i.e. Check, ACH or wire.

POWERED BY pollen

Copyright 2008, All Rights Reserved

DYNAMIC DISCOUNTING SYSTEM AND METHOD

CROSS-REFERENCE TO RELATED APPLICATIONS

This application is a continuation of U.S. patent application Ser. No. 12/262,477 filed Oct. 31, 2008 and titled "DYNAMIC DISCOUNTING SYSTEM AND METHOD," the entire contents of which are incorporated by reference herein.

BACKGROUND

Field of the Invention

At least one embodiment in accord with the present invention relates generally to methods and systems for discounting debt, and more specifically, to methods and systems for dynamically discounting debt.

Discussion of Related Art

Discounting of short term trade debt is a common business practice. Under conventional discounting arrangements, a debtor, who is typically a company that has purchased goods or services, is offered favorable terms from a creditor, who is customarily a supplier of the purchased goods or services, in exchange for quick payment of debt. These favorable terms often involve discounting the amount owed if the debt is paid within a specified time frame. Terms vary by industry and company, but discount rates ranging from one percent to three percent are commonly associated with early payment of trade debt. Under conventional discounting arrangements, the discounting terms are set before the purchased goods or services are delivered to the purchasing company.

Various processes and software applications, such as Enterprise Resource Planning software, have been developed to streamline the processing of the accounts receivable and the accounts payable resulting from trade debt. These processes often allow debtor companies to process payment vouchers with the speed necessary to take advantage of offered discounts. Thus, conventional systems allow both the debtor-purchaser and the creditor-supplier to transact business in a regular, standardized fashion.

SUMMARY OF THE INVENTION

Some aspects in accord with the present invention manifest an appreciation that debtors and creditors, such as purchasers and suppliers, would benefit from more precise and automatic management of discounting trade debt than is available using conventional technology. For example, both debtors and creditors may wish to vary standard discounting terms based on their current financial situation. Thus at least one embodiment in accord with the present invention provides for a system that enables debtors and creditor to pursue credit terms that are more tailored to their current financial concerns.

According to one aspect, a computer implemented method for conducting a payment auction is provided. The method includes acts of receiving a plurality of bids from a plurality of bidders, each bid of the plurality of bidders associated with at least one bidder of the plurality of bidders and each bid of the plurality of bids having an associated discount rate, determining an eligibility for acceptance of multiple bids of the plurality of bids based at least in part on the discount rate associated with each bid of the plurality of bids and indicating, via a computer system, the eligibility for acceptance of the multiple bids relative to other bids of the plurality of bids.

According to an embodiment, the method may further include an act of receiving an auction goal for a total amount of payment auctioned and the act of determining the eligibility for acceptance may include an act of determining an eligibility for acceptance of multiple bids based at least in part on the auction goal. In another embodiment, the method may further include an act of receiving a hurdle rate and the act of determining the eligibility for acceptance may include an act of comparing the discount rate associated with each bid to a rate based at least in part on the hurdle rate. In an additional embodiment, the method may further include acts of determining a margin by which at least one bid of the plurality of bids is eligible and indicating, via a computer system, a representation based at least in part on the margin. According to another embodiment, the act of determining the eligibility for acceptance may include an act of determining a market discount rate base at least in part on the discount rate associated with each bid of the plurality of bids.

According to another embodiment, the method may further include an act of repeating, until a terminating condition occurs, the acts of receiving a plurality of bids, determining an eligibility for acceptance of multiple bids and indicating, via the computer system, the eligibility for acceptance of the multiple bids. In another embodiment, the method may further include act of determining, after the terminating condition occurs, an eligibility for acceptance of each bid based at least in part on the discount rate associated with each bid; and indicating, via the computer system, the eligibility for acceptance of each bid.

According to another embodiment, the method may further include acts of receiving a hurdle rate and allocating a portion of the auction goal to any bid of the plurality of bids with a discount rate greater than a rate based at least in part on the hurdle rate. In another embodiment, the method may further include an act of repeating, until a terminating condition occurs, the acts of receiving a plurality of bids, allocating a portion of the auction goal to any bid of the plurality of bids with a discount rate greater than a rate based at least in part on the hurdle rate, determining an eligibility for acceptance of multiple bids, and indicating, via a computer system, the eligibility for acceptance of the multiple bids. In an additional embodiment, the act of repeating, until a terminating condition occurs, may include an act of repeating, until either the allocated portions substantially equal the auction goal or a threshold time is exceeded. In yet another embodiment, the method may further include acts of determining, after the terminating condition occurs, an eligibility for acceptance of each bid based at least in part on the discount rate of each bid and indicating, via the computer system, the eligibility for acceptance of each bid.

According to another embodiment, the method may further include an act of receiving an identity of each of the plurality of bidders from an external entity. In an additional embodiment, the method may further include an act of receiving debt amounts associated with each of the plurality of bidders from an external entity.

According to another aspect, a system for conducting a payment auction is provided. The system includes a network interface, a storage medium, and a controller coupled to the network interface and the storage medium and configured to receive, via the network interface, a plurality of bids from a plurality of bidders, each bid of the plurality of bids associated with at least one bidder of the plurality of bidders and each bid of the plurality of bids having an associated discount rate, determine an eligibility for acceptance of multiple bids of the plurality of bids based at least in part on the discount rate associated with each bid of the plurality of bids and indicate, via the network interface, the eligibility for acceptance of the multiple bids relative to other bids of the plurality of bids.

According to another embodiment, the controller may be further configured to receive an auction goal for a total amount of payment auctioned and determine the eligibility for acceptance of the multiple bids based at least in part on the auction goal. In another embodiment, the controller may be further configured to receive a hurdle rate and determine an eligibility for acceptance by comparing the discount rate associated with each bid to a rate based at least in part on the hurdle rate. In an additional embodiment, the controller may be further configured to determine a margin by which at least one bid of the plurality of bids is eligible and indicate, via the network interface, a representation based at least in part on the margin. In a further embodiment, the controller may be further configured to determine the eligibility for acceptance by determining a market discount rate base at least in part on the discount rate associated with each bid of the plurality of bids.

According to another embodiment, the controller may be further configured to repeatedly receive, via the network interface, a plurality of bids, determine an eligibility for acceptance of multiple bids and indicate, via the network interface, the eligibility for acceptance of the multiple bids relative to other bids of the plurality of bids, until a terminating condition occurs. In another embodiment, the controller may be further configured to determine, after the terminating condition occurs, an eligibility for acceptance of each bid based at least in part on the discount rate of each bid and indicate, via the network interface, the eligibility for acceptance of each bid.

According to another embodiment, the controller may be further configured to receive a hurdle rate and allocate a portion of the auction goal to any bid of the plurality of bids with a discount rate greater than a rate based at least in part on the hurdle rate. In another embodiment, the controller may be further configured to repeatedly receive, via the network interface, a plurality of bids, determine an eligibility for acceptance of multiple bids, allocate a portion of the auction goal to any bid of the plurality of bids with a discount rate greater than the rate based at least in part on the hurdle rate and indicate, via the network interface, the eligibility for acceptance of the multiple bids, until a terminating condition occurs. In an additional embodiment, the controller may be further configured to determine, after the terminating condition occurs, an eligibility for acceptance of each bid based at least in part on the discount rate of each bid and indicate, via the network interface, the eligibility for payment of each bid.

According to another aspect, a computer implemented method for conducting an auction is provided. The method includes acts of receiving a plurality of bids from a plurality of bidders, each bid of the plurality of bids associated with at least one bidder of the plurality of bidders and each bid of the plurality of bids having an associated bid amount, determining an eligibility for acceptance of at least one bid of the plurality of bids based at least in part on the bid amount associated with each bid of the plurality of bids, determining a margin by which at least one bid of the plurality of bids is eligible and indicating, via a computer system, a representation based at least in part on the margin.

According to an embodiment, the method may further include an act of receiving an auction goal for a total amount of inventory auctioned and the act of determining the eligibility for acceptance may include an act of determining an eligibility for acceptance of multiple bids based at least in part on the auction goal. In an embodiment, the method may include an act of repeating, until a terminating condition occurs, the acts of receiving a plurality of bids, determining an eligibility for acceptance of at least one bid, determining a margin and indicating, via the computer system, a representation based at least in part on the margin. In another embodiment, According to another aspect, a method for discounting debt is provided. The method includes acts of receiving a plurality of bids for payment from a plurality of creditors, each bid of the plurality of bids associated with at least one creditor of the plurality of creditors and having an associated debt amount and an associated discount rate, determining an eligibility for payment of at least one bid of the plurality of bids based at least in part on the debt amount associated with each bid of the plurality of bids and the discount rate associated with each bid of the plurality of bids and indicating, via a computer system, the eligibility for payment of the at least one bid relative to other bids of the plurality of bids.

According to an embodiment, the method may further include an act of receiving an auction goal for a total amount of payment auctioned and the act of determining the eligibility for payment may include an act of determining an eligibility for payment of multiple bids based at least in part on the auction goal. In an embodiment, the method may further include an act of receiving a hurdle rate and the act of determining the eligibility for payment may include an act of comparing the discount rate associated with each bid to a rate based at least in part on the hurdle rate. In another embodiment, the method may further include acts of determining a margin by which at least one bid of the plurality of bids is eligible and indicating, via a computer system, a representation based at least in part on the margin. In an additional embodiment, the method may further include an act of repeating, until a terminating condition occurs, the acts of receiving a plurality of bids, determining an eligibility for payment of multiple bids and indicating, via the computer system, the eligibility for payment of the multiple bids. In a further embodiment, the act of receiving a plurality of bids from a plurality of creditors may include an act of receiving a plurality of bids from a plurality of suppliers, each supplier of the plurality of suppliers holding a portion of the debt.

According to an embodiment, the act of receiving a plurality of bids from a plurality of creditors may include an act of receiving a plurality of bids from a plurality of employed entities, each employed entity of the plurality of employed entities holding a portion of the debt. In an embodiment, the act of receiving a plurality of bids from a plurality of creditors may include an act of receiving a plurality of bids from a plurality of employed entities, each employed entity of the plurality of employed entities holding a portion of the debt and the method further comprises accepting the at least one bid.

Still other aspects, embodiments, and advantages of these exemplary aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. The accompanying drawings are included to provide illustration and a further understanding of the various aspects and embodiments, and are incorporated in and constitute a part of this specification. The drawings, together with the remainder of the specification, serve to explain principles and operations of the described and claimed aspects and embodiments.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 8 shows an example interface through which a user may place bids according to an embodiment;

DETAILED DESCRIPTION

Figure 1:
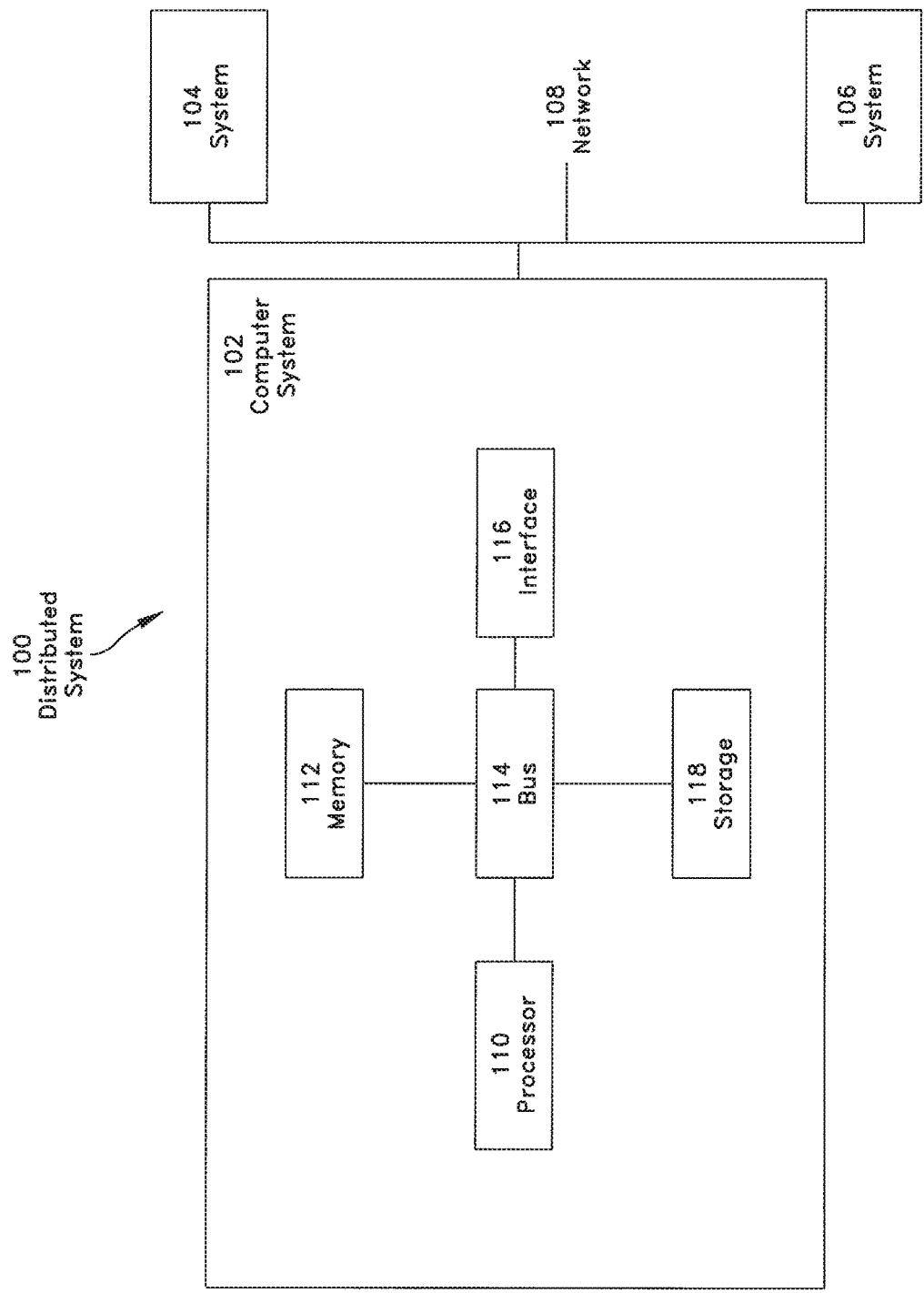
FIG. 1 shows an example computer system upon which various aspects in accord with the present invention may be implemented.

At least one embodiment in accord with the present invention relates to a system that allows a seller to auction inventory to a plurality of bidders. According to this embodiment, the system may determine an eligibility for acceptance of bids submitted by the bidders, and a plurality of bids may be determined to be eligible for acceptance. Further, according to this embodiment, a margin by which the bids are acceptable may be determined, and a representation of the margin may be communicated to the bidders.

In another embodiment, a method is provided for discounting debt using an auction system. According to this embodiment, a seller may configure an auction event with auction parameters that will best serve one or more goals the seller may have for the auction. Further, according to this embodiment, the seller may alter event parameters while the event is ongoing, thus further enhancing the ability of the seller to meet auction objectives.

The aspects disclosed herein, which are in accord with the present invention, are not limited in their application to the details of construction and the arrangement of components set forth in the following description or illustrated in the drawings. These aspects are capable of assuming other embodiments and of being practiced or of being carried out in various ways. Examples of specific implementations are provided herein for illustrative purposes only and are not intended to be limiting. In particular, acts, elements and features discussed in connection with any one or more embodiments are not intended to be excluded from a similar role in any other embodiments.

For example, according to one embodiment of the present invention, a computer system is configured to perform any of the functions described herein, including but not limited to, configuring, conducting and analyzing auction events. However, such a system may also perform other functions, such as suggesting auction parameters, based on, for example, historical auction performance. Moreover, the systems described herein may be configured to include or exclude any of the functions discussed herein. Thus the invention is not limited to a specific function or set of functions. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items.

Computer System

Various aspects and functions described herein in accord with the present invention may be implemented as hardware or software on one or more computer systems. There are many examples of computer systems in use currently including network appliances, personal computers, workstations, mainframes, networked clients, servers, media servers, application servers, database servers and web servers. Other examples of computer systems may include mobile computing devices, such as cellular phones, personal digital assistants, and network equipment, such as load balancers, routers and switches. Further, aspects in accord with the present invention may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Thus, the invention is not limited to executing on any particular system or group of systems. Further, aspects may be implemented in software, hardware or firmware, or any combination thereof. Thus, aspects in accord with the present invention may be implemented within methods, acts, systems, system elements and components using a variety of hardware and software configurations, and the invention is not limited to any particular distributed architecture, network, or communication protocol.

FIG. 1 shows a block diagram of a distributed computer system 100, in which various aspects and functions in accord with the present invention may be practiced. Distributed computer system 100 may include one more computer systems. For example, as illustrated, distributed computer system 100 includes computer systems 102, 104 and 106. As shown, computer systems 102, 104 and 106 are interconnected by, and may exchange data through, communication network 108. Network 108 may include any communication network through which computer systems may exchange data. To exchange data using network 108, computer systems 102, 104 and 106 and network 108 may use various methods, protocols and standards, including, among others, token ring, ethernet, wireless ethernet, Bluetooth, TCP/IP, UDP, Http, FTP, SNMP, SMS, MMS, SS7, Json, Soap, and Corba. To ensure data transfer is secure, computer systems 102, 104 and 106 may transmit data via network 108 using a variety of security measures including TSL, SSL or VPN among other security techniques. While distributed computer system 100 illustrates three networked computer systems, distributed computer system 100 may include any number of computer systems and computing devices, networked using any medium and communication protocol.

Various aspects and functions in accord with the present invention may be implemented as specialized hardware or software executing in one or more computer systems including computer system 102 shown in FIG. 1. As depicted, computer system 102 includes processor 110, memory 112, bus 114, interface 116 and storage 118. Processor 110 may perform a series of instructions that result in manipulated data. Processor 110 may be a commercially available processor such as an Intel Pentium, Motorola PowerPC, SGI MIPS, Sun UltraSPARC, or Hewlett-Packard PA-RISC processor, but may be any type of processor or controller as many other processors and controllers are available. Processor 110 is connected to other system elements, including one or more memory devices 112, by bus 114.

Memory 112 may be used for storing programs and data during operation of computer system 102. Thus, memory 112 may be a relatively high performance, volatile, random access memory such as a dynamic random access memory (DRAM) or static memory (SRAM). However, memory 112 may include any device for storing data, such as a disk drive or other non-volatile storage device. Various embodiments in accord with the present invention may organize memory 112 into particularized and, in some cases, unique structures to perform the aspects and functions disclosed herein.

Components of computer system 102 may be coupled by an interconnection element such as bus 114. Bus 114 may include one or more physical busses (for example, between components that are integrated within a same machine), but may include any communication coupling between system elements including specialized or standard computing bus technologies such as IDE, SCSI, PCI and InfiniBand. Thus, bus 114 enables communications (for example, data and instructions) to be exchanged between system components of computer system 102.

Computer system 102 also includes one or more interface devices 116 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow computer system 102 to exchange information and communicate with external entities, such as users and other systems.

Storage system 118 may include a computer readable and writeable nonvolatile storage medium in which instructions are stored that define a program to be executed by the processor. Storage system 118 also may include information that is recorded, on or in, the medium, and this information may be processed by the program. More specifically, the information may be stored in one or more data structures specifically configured to conserve storage space or increase data exchange performance. The instructions may be persistently stored as encoded signals, and the instructions may cause a processor to perform any of the functions described herein. The medium may, for example, be optical disk, magnetic disk or flash memory, among others. In operation, the processor or some other controller may cause data to be read from the nonvolatile recording medium into another memory, such as memory 112, that allows for faster access to the information by the processor than does the storage medium included in storage system 118. The memory may be located in storage system 118 or in memory 112, however, processor 110 may manipulate the data within the memory 112, and then copy the data to the medium associated with storage system 118 after processing is completed. A variety of components may manage data movement between the medium and integrated circuit memory element and the invention is not limited thereto. Further, the invention is not limited to a particular memory system or storage system.

Although computer system 102 is shown by way of example as one type of computer system upon which various aspects and functions in accord with the present invention may be practiced, aspects of the invention are not limited to being implemented on the computer system as shown in FIG. 1. Various aspects and functions in accord with the present invention may be practiced on one or more computers having a different architectures or components than that shown in FIG. 1. For instance, computer system 102 may include specially-programmed, special-purpose hardware, such as for example, an application-specific integrated circuit (ASIC) tailored to perform a particular operation disclosed herein. While another embodiment may perform the same function using several general-purpose computing devices running MAC OS System X with Motorola PowerPC processors and several specialized computing devices running proprietary hardware and operating systems.

Computer system 102 may be a computer system including an operating system that manages at least a portion of the hardware elements included in computer system 102. Usually, a processor or controller, such as processor 110, executes an operating system which may be, for example, a Windows-based operating system (for example, Windows NT, Windows 2000 (Windows ME), Windows XP operating systems) available from the Microsoft Corporation, a MAC OS System X operating system available from Apple Computer, one of many Linux-based operating system distributions (for example, the Enterprise Linux operating system available from Red Hat Inc.), a Solaris operating system available from Sun Microsystems, or a UNIX operating systems available from various sources. Many other operating systems may be used, and embodiments are not limited to any particular implementation.

The processor and operating system together define a computer platform for which application programs in high-level programming languages may be written. These component applications may be executable, intermediate (for example, C−) or interpreted code which communicate over a communication network (for example, the Internet) using a communication protocol (for example, TCP/IP). Similarly, aspects in accord with the present invention may be implemented using an object-oriented programming language, such as SmallTalk, Java, C++, Ada, or C# (C-Sharp). Other object-oriented programming languages may also be used. Alternatively, functional, scripting, or logical programming languages may be used.

Additionally, various aspects and functions in accord with the present invention may be implemented in a non-programmed environment (for example, documents created in HTML, XML or other format that, when viewed in a window of a browser program, render aspects of a graphical-user interface or perform other functions). Further, various embodiments in accord with the present invention may be implemented as programmed or non-programmed elements, or any combination thereof. For example, a web page may be implemented using HTML while a data object called from within the web page may be written in C++. Thus, the invention is not limited to a specific programming language and any suitable programming language could also be used.

A computer system included within an embodiment may perform functions outside the scope of the invention. For instance, aspects of the system may be implemented using an existing commercial product, such as, for example, Database Management Systems such as SQL Server available from Microsoft of Seattle WA, Oracle Database from Oracle of Redwood Shores, Calif., and MySQL from MySQL AB of Uppsala, Sweden or integration software such as Web Sphere middleware from IBM of Armonk, N.Y. However, a computer system running, for example, SQL Server may be able to support both aspects in accord with the present invention and databases for sundry applications not within the scope of the invention.

Example System Architecture

Figure 2:
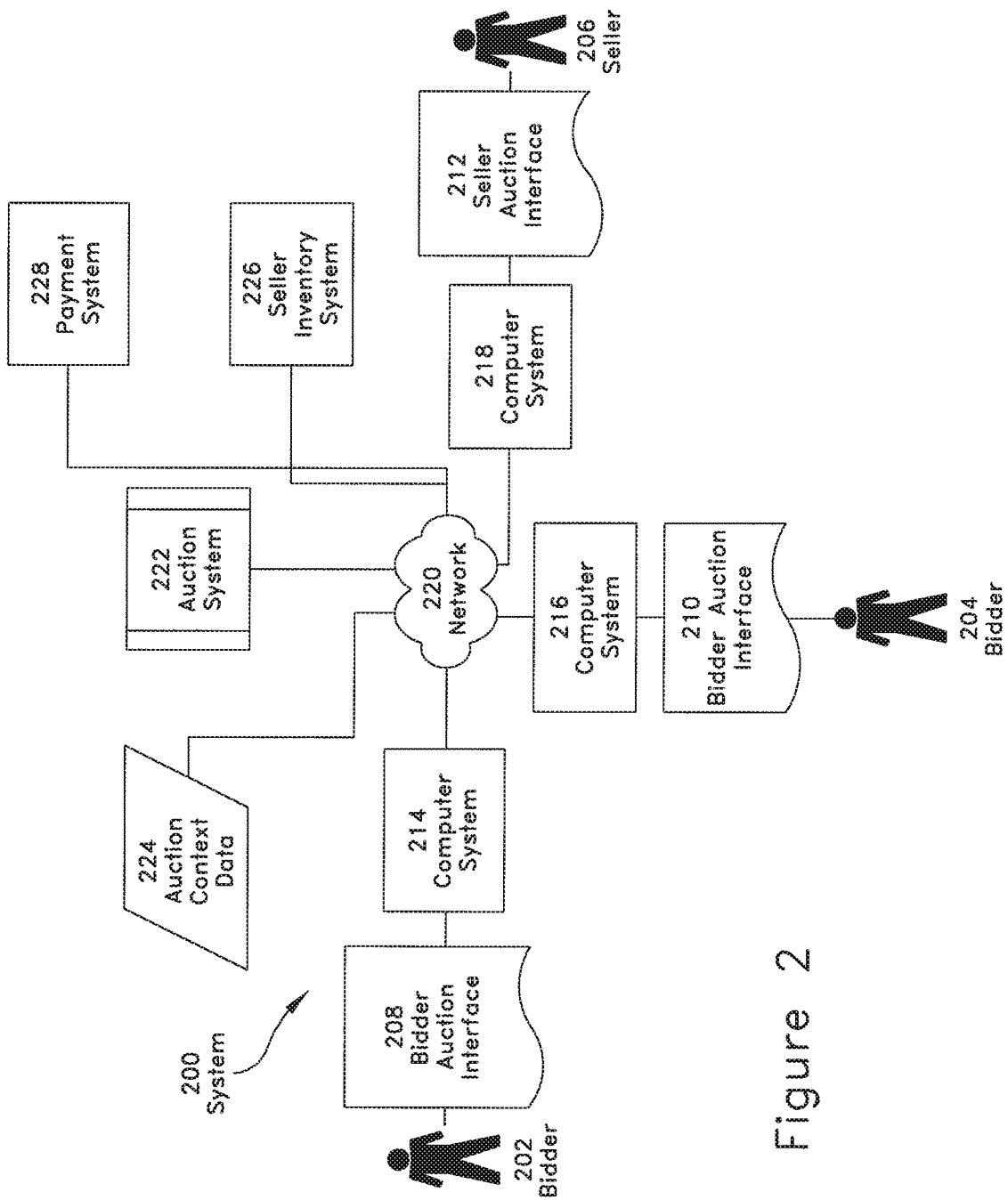
FIG. 2 illustrates an example distributed system including an auction system according to an embodiment.

FIG. 2 presents a context diagram of distributed system 200 specially configured to include an embodiment in accord of the present invention. Referring to FIG. 2, system 200 may include bidders 202 and 204, seller 206, bidder auction interfaces 208 and 210, seller auction interface 212, computer systems 214, 216 and 218, communications network 220, auction system 222, auction context data 224, seller inventory system 226 and payment system 228. System 200 may allow bidders 202 and 204 to interact with bidder auction interfaces 208 and 210, respectively. Similarly, system 200 may allow seller 206 to interact with seller auction interface 212. System 200 may also allow auction system 222 to interact with seller inventory system 226 and payment system 228 and receive auction context data 224.

According to the depicted embodiment, auction interfaces 208, 210 and 212 may be browser-based user interfaces served by auction system 222 and may be rendered by computer systems 214, 216 and 218. Computer systems 214, 216 and 218 may be interconnected with one another and auction system 222 via network 220. Network 220 may include any communication network through which member computer systems may exchange data.

The sundry computer systems shown in FIG. 2, which include computer systems 214, 216 and 218, network 220, auction system 222, seller inventory system 226 and payment system 228, each may include one or more computer systems. As discussed above with regard to FIG. 1, computer systems may have one or more processors or controllers, memory and interface devices. The particular configuration of system 200 depicted in FIG. 2 is used for illustration purposes only and embodiments of the invention may be practiced in other contexts. Thus, the invention is not limited to a specific number of users or systems.

Auction system 222 may manage auctions between one or more sellers and one or more bidders, such as seller 206 and bidders 202 and 204. In the illustrated embodiment, auction system 222 may provide bidder auction interfaces 208 and 210 to bidders 202 and 204, respectively. Auction system 222 may also provide seller auction interface 212 to seller 206. Auction interfaces 208, 210 and 212 may be presented to users 202, 204 and 206 via network 220 on computer systems 214, 216 and 218, respectively. As discussed below, auction system 222 may enable users to participate in an auction with particular, specialized characteristics.

For example, in one embodiment, seller 206 may establish, by interacting with seller auction interface 212, one or more bid floors that is required for bidders 202 and 204 to buy inventory. Further seller auction interface 212 may enable seller 206 to raise or lower the bid floors while the auction is ongoing. In another embodiment, bidder auction interface 208 may present bidders 202 and 204 with a representation of whether bids have surpassed a bid floor and may also present a representation of a margin by which such bids have surpassed the bid floor. According to other embodiments, bidder auction interface 208 may present bidders 202 and 204 with a representation of a deficient between bids and the bid floor. Thus, auction system 222 provides sellers with an ability to manipulate sales terms during an auction, while providing buyers with unconventional competitive information.

In another embodiment, auction system 222 may facilitate auctions in which the bids of a plurality of bidders are accepted. For example, according to this embodiment, bidders 202 and 204 may place bids with different characteristics, and all of the bids may be determined to be eligible for acceptance. In this situation, at the close of the auction all bids eligible for acceptance may be accepted.

In various embodiments, auction system 222 may receive auction context data 224 from a variety of sources and may use it in determining preferable auction characteristics. Auction context data 224 may include any current or past data that may affect the conduct of auction participants or from which future conduct of auction participants may be discerned. Examples of auction context data 224 include, among other data, financial market data, economic data and political information, as well as seller and bidder liquidity, and durability of auctioned inventory.

In some embodiments, auction system 222 may receive seller inventory information from seller inventory system 226 and may use it to determine various auction characteristics. The information provided by seller inventory system 226 may include any information describing the subjects of an auction. Examples of the information provided by seller inventory system 226 include, among other information, inventory quantity, owners of the inventory, asking price of inventory and entities associated with inventory, such as potential bidders.

As is discussed further below, in some embodiments, seller inventory system 226 may be any of a variety of external systems. In one embodiment, seller inventory system 226 may be an accounting system with accounts payable (hereinafter, "A/P") information. In an alternative embodiment, seller inventory system 226 may be a payroll system with payroll information concerning employed entities.

In other embodiments, auction system 222 may exchange data with payment system 228 to clear and settle auction transactions. This data exchange may include requests for payment between auction participants. These requests for payment may result in funds transfer from bidder to seller or from seller to bidder.

According to another embodiment, a third party, such as a financial institution or system service provider, acts as a financial intermediary between bidders and sellers. In this embodiment, auction system 222 may request that payment system 228 transfer funds from the bidder to the financial intermediary. The financial intermediary may then transfer the funds from this and other bidders to the seller in a second transaction. In this way, the anonymity of the bidders may be preserved, i.e. the seller may not know the identity of particular bidders and the amount of discount each bid.

As is discussed further below, various embodiments of auction system 222 may facilitate the dynamic discounting of debt. In some embodiments, this debt is short term trade debt. In the context of these auctions, bidders may be suppliers or creditors holding accounts receivable associated with payment obligations. Sellers may be debtors who have purchased goods or services from the suppliers and now have A/P associated with the payment obligations.

Interestingly, in some of these example embodiments, the inventory to be auctioned is payment, delivered at an identified date and time. For example, in one embodiment, sellers are employers who auction payment of wages, expenses, bonuses, etc. . . . to employed entities; the payment to be delivered at a future date and time. In another embodiment, sellers are purchasers who auction payment of A/P owed to suppliers; the payment to be delivered at a future date and time.

Figure 3:
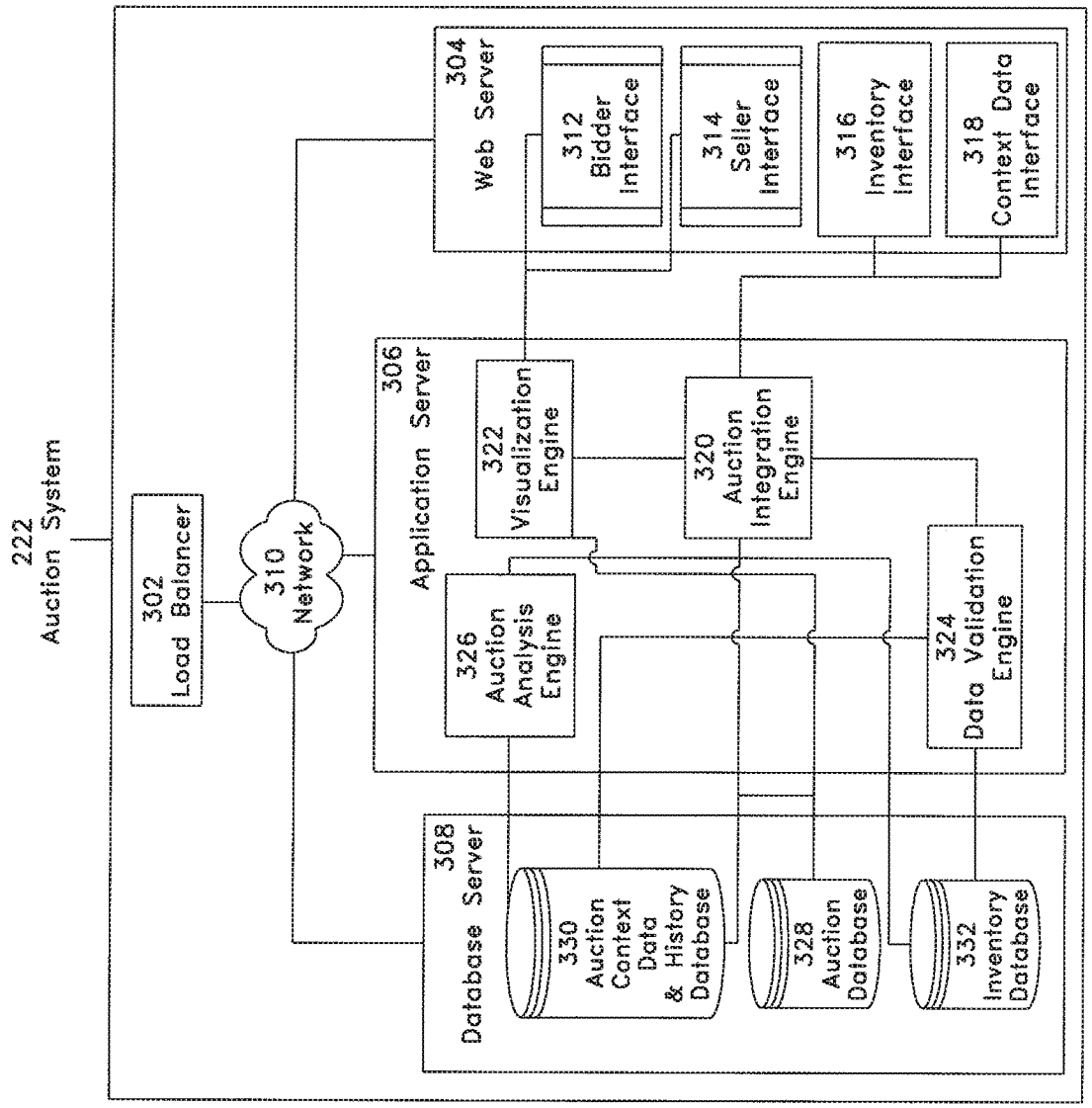
FIG. 3 depicts an example physical and logical diagram for an auction system according to an embodiment.

FIG. 3 provides a more detailed illustration of a particular physical and logical configuration of auction system 222 as a distributed system. The system structure and content recited below are for exemplary purposes only and is not intended to limit the invention to the specific structure shown in FIG. 3. As will be apparent to one of ordinary skill in the art, many variant system structures can be architected without deviating from the scope of the present invention. The particular arrangement presented in FIG. 3 was chosen to promote clarity.

Information may flow between the depicted elements, components and subsystems using any technique. Such techniques include, for example, passing the information over the network via TCP/IP, passing the information between modules in memory and passing the information by writing to a file, database, or some other non-volatile storage device. Other techniques and protocols may be used without departing from the scope of the invention.

In the embodiment illustrated in FIG. 3, auction system 222 includes five primary physical elements: load balancer 302, web server 304, application server 306, database server 308 and network 310. Each of these physical elements may include one or more computer systems as discussed with reference to FIG. 1 above. Further, in the illustrated embodiment, web server 304 includes four logical elements, bidder interface 312, seller interface 314, inventory interface 316 and context data interface 318. Application server 306 includes 4 logical elements auction integration engine 320, visualization engine 322, data validation engine 324 and auction analysis engine 326. Database server 308 includes three logical elements, auction database 328, auction context data & history database 330 and inventory database 332.

In one embodiment, load balancer 302 may provide load balancing services to the other elements of auction system 222. Network 310 may include any communication network through which member computer systems may exchange data. Web server 304, application server 306 and database server 308 may be, for example, one or more computer systems as described above with regard to FIG. 1. For a high volume website, web server 304, application server 306 and database server 308 may include multiple computer systems, but embodiments may include any number of computer systems. Web server 304 may serve content using any suitable standard or protocol including, among others, Http, HTML, DHTML, XML and PHP.

In the embodiment illustrated in FIG. 3, web server 304 may support bidder interface 312, seller interface 314, inventory interface 316 and context data interface 318. Bidder interface 312 may receive information regarding bidders and bidder activity from a variety of external entities. Further, bidder interface 312 may provide the bidder information to auction integration engine 320. Conversely, bidder interface 312 may receive bidder information from auction integration engine 320 and may provide the bidder information to external entities.

In this embodiment, seller interface 314 may receive information relating sellers and seller activity from a variety of external entities. Additionally, seller interface 314 may provide seller information to auction integration engine 320. Conversely, seller interface 314 may receive bidder information from auction integration engine 320 and may provide the seller information to external entities.

In the depicted embodiment, inventory interface 316 may receive information relating inventory from a variety of external entities. Moreover, inventory interface 316 may provide inventory information to auction integration engine 320. Conversely, inventory interface 316 may receive inventory information from auction integration engine 320 and may provide the inventory information to external entities.

In the embodiment shown FIG. 3, with additional reference to FIG. 2, context data interface 318 may receive information auction context data 244 from a variety of external entities. In addition, context data interface 318 may provide auction context data to auction integration engine 320. Conversely, context data interface 318 may receive auction context data 224 from auction integration engine 320 and may provide auction context data 324 to external entities.

Referring again to FIG. 3, application server 306 may provide resources to auction integration engine 320, visualization engine 322, data validation engine 324 and auction analysis engine 326. Auction integration engine 320 may provide information to and receive information from several logical elements including inventory interface 316, context data interface 318, visualization engine 322, data validation engine 324, auction analysis engine 326, auction database 328, auction context data & history database 330 and inventory database 332. Visualization engine 322 may receive information from bidder interface 312, seller interface 314, auction integration engine 320 and auction database 328 and may provide information to bidder interface 312, seller interface 314, auction integration engine 320 and auction database 328. Data validation engine 324 may receive data from auction integration engine 320 and provide validated data to auction context data & history database 330 and inventory database 332. Auction analysis engine 326 may receive information from auction integration engine 320, auction database 328 and auction context data & history database 330 and may provide information to auction integration engine 320 and auction context data & history database 330.

Auction database 328 may store any information regarding scheduled and ongoing auctions. According to one embodiment, each auction may be a scheduled event. In this embodiment auction database 328 may include, among other information, event configuration information, event logistical information, event inventory information and event bidder information. The event configuration information may include information describing the characteristics of an event and of entities associated with, or sponsoring, the event. In one embodiment, the event configuration information may include, for each event, an identifier of the event, a name for the event, an organization sponsoring the event, an auction type under which the event will be conducted, a description of the event, an owner of the event, an email address of the owner and a phone number of the owner. In this embodiment, the owner may be the seller of the inventory, although this is not required. The organization sponsoring the event may be the owner or a subdivision of the owner, such as a department within a corporation, or an agent of the owner, such as a subsidiary or affiliate of a corporation.

In an embodiment, the event logistical information may include any information that pertains to the chronology of an event, the scheduling of the event or the facilities surrounding and supporting the event. Thus, logistical information may include a start date and time for an event and an end date and time for an event. Further, the logistical information may include other information such as a date and time the event was created, a date and time for a when the event may be previewed by registered participants and a date and time by which bidders must register their intent to participate.

In another embodiment, the event inventory information may include any information describing characteristics of inventory to be auctioned during an event. The inventory information may describe the inventory as a whole or a subset of elements in the inventory. The information may include, among other information, a description, an amount, a location, a quality assessment, a bid floor, a bid ceiling, a preferred auctioning sequence and entities associated with the inventory such as producers, owners and potential bidders.

Auction context data & history database 330 may store any information regarding auctions that are underway or have been conducted in the past and any auction context information collected from within auction system 222 or delivered from external entities. As discussed above, the auction context data may include, among other data, financial market data, economic data and political information, as well as seller and bidder liquidity, and durability of auctioned inventory. Examples of financial market data include financial instrument values and financial instrument index values, such as stock values, stock index values, option values, bond values and the like. Examples of economic data include Gross Domestic Product, the index of leading economic indicators, unemployment rates and inflation rates. Examples of political information include political and societal unrest, regime changes and elections. Other types of information suspected as having an affect on auction conduct may be included in auction context data & history database 330.

In another embodiment, auction context data & history database 330 may include historical auction information. This information may include, among other information, the auction information discussed above with regard to auction database 328, including event information for events conducted in the past. In addition, auction context data & history database 330 may include information from analysis of the historical auction information. In one embodiment various statistical summarizations are calculated from auction data including, among others, amount of bids, number of bidders, frequency of bids, identity of bidders, duration of the auction, amount of inventory in total, amount of inventory remaining, bid floor, bid ceiling, movement of the bid floor or ceiling during the auction, frequency with which margin information is provided to the bidders and the precision of the margin information. Examples of the statistical summarizations that may be determined include, among others, local and absolute minimums, local and absolute maximums, averages, means, medians, modes, variances, standard deviations or other data distribution characterizations and correlation coefficients between auction data. Moreover, these and other statistical summarizations may be determined for auction data analyzed with auction context data.

In various embodiments, auction context data & history database 330 may store and provide information using techniques to protect bidder anonymity. For example, in one embodiment auction context data & history database 330 may secure tables and views to prevent sellers from accessing the identity of bidders and bids associate with the bidders. In another embodiment, bid details may be summarized and, as part of the summarization process, information linking bidders to specific bids may be removed.

Inventory database 332 may store any information relating to inventory that may be auctioned using auction system 222. The inventory information stored may relate to the inventory as a whole or subsets of element of inventory. This information may include, among other information, descriptions, amounts, locations, quality assessments, expiration dates and entities associated with the inventory such as producers, owners and potential bidders.

The databases 328, 330 and 332 may take the form of any logical construction capable of storing information on a computer readable medium including flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

Figure 5:
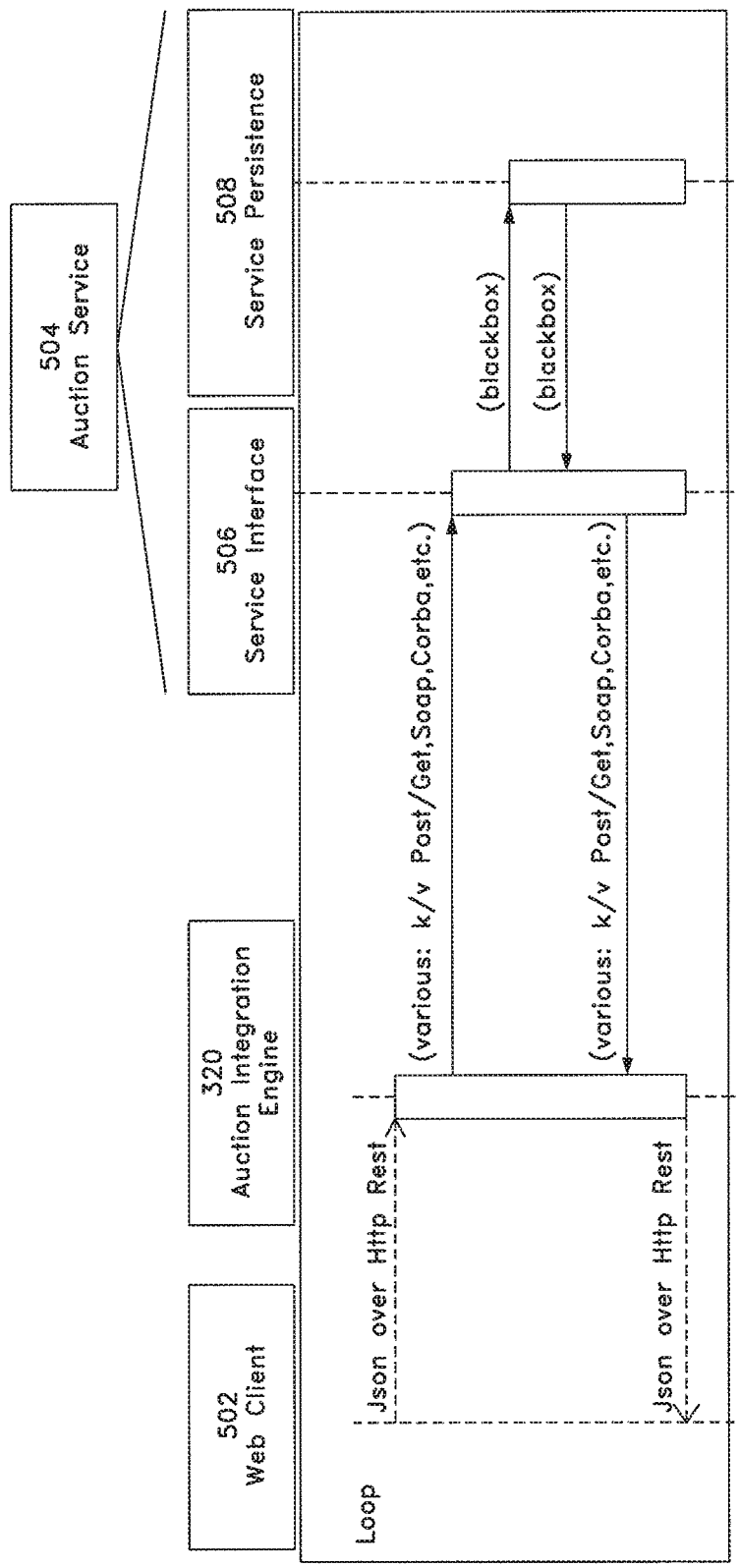
FIG. 5 illustrates another example information flow according to an embodiment.

In various embodiments, auction integration engine 320 may enable interoperation between various system elements and external entities, including external systems. FIG. 5 shows an example scenario in which auction integration engine 320 provides web client 502 with requested auction service 504. Web client 502 may be any external entity that communicates with auction integration engine 320 using internet communication standards, such as, among others, TCP/IP, UDP, Http, HTML and XML. A typical example of a web client is an internet browser, although this is not a requirement, and any suitable automation may be used to interact with auction integration engine 320.

According to this example, auction service 504 may be any auction service provided by auction system 222. As illustrated, auction service 504 includes service interface 506 and service persistence 508. Service interface 506 may expose one or more system interfaces through which other systems and system elements may invoke the functionality of auction service 504. In the depicted example, auction service 504 manages its own persistence, i.e. maintains data as required to properly function, through service persistence 508. Examples of auction services include visualization engine 322, data validation engine 324 and auction analysis engine 326. Other examples may include data objects (not shown in FIG. 3) that may be instantiated in application server 306, or elsewhere, to manage data exchange with any database supported by database server 308 including databases 328, 330 and 332.

In this example, web client 502 transmits a request to invoke functionality associated with an auction, such as, for example, a request to place a bid. Web client 502 transmits this request in Json over Http Rest to integration engine 320. Integration engine 320 determines the proper manner in which to invoke the service requested and issues a request, using the proper method, to service interface 506. Examples of service standards supported by integration engine 320 include, among others, Http Post, Http Get, Soap and Corba. According to this example, auction service 504 then services the request and retrieves or stores any needed data using service persistence 508. Auction service 504 then responds to integration engine 320 using service interface 506. In this example, service interface 506 responds to auction integration engine 320 using logic that is standard for auction service 504. As shown, auction engine 320 then responds to web client 502 using Json over Http Rest. The wide variety of communication methods supported by integration engine 320 provides auction system 222 with the flexibility to integrate with a wide variety of external entities.

While in this example, integration engine 320 responds to the request of web client 502 by invoking one auction service, this one-to-one correspondence is not a requirement. In various embodiments, integration engine 320 may respond to requests without invoking additional auction services or based on responses from two or more auction services.

Additionally, in another embodiment, web client 502 may include a combination of two or more computer systems. For example, in one embodiment, a mobile computing device, such as a mobile phone, and an SS7/SMS gateway are combined to form a web client 502. In this embodiment, a request in the form of a text message may be transmitted from the mobile phone to the SS7/SMS gateway. The SS7/SMS gateway may then convert the SS7/SMS/MMS text message to an Http Post or Http Get, thus emulating any other web client. The system response may also be converted from an Http response to a text message by the SS7/SMS gateway prior to its delivery to the mobile computing device.

Figure 6:
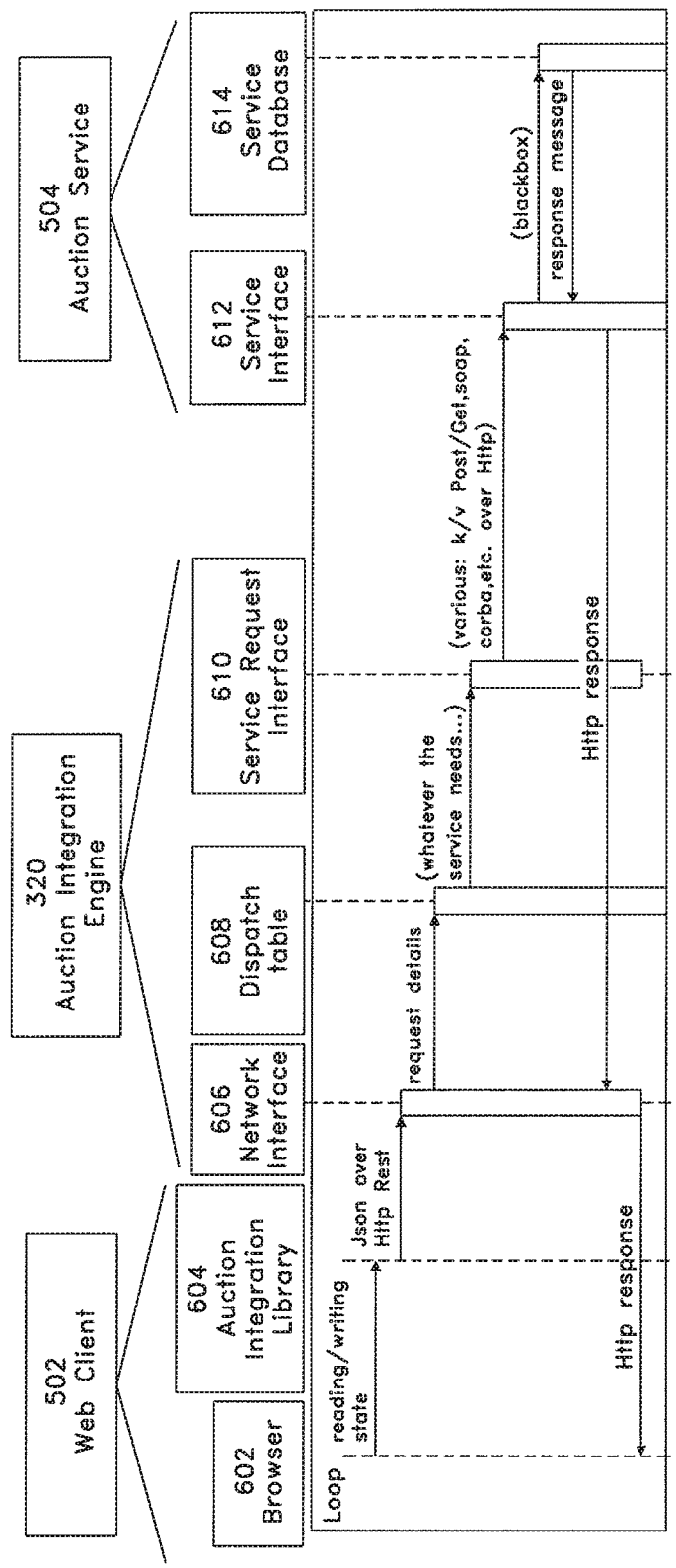
FIG. 6 shows another example information flow according to an embodiment.

FIG. 6 illustrates another example scenario in which auction integration engine 320 provides web client 502 with requested auction service 504. In this example, web client 502 includes browser 602 and auction integration library 604. Auction integration engine 320 includes network interface 606, dispatch table 608 and service request interface 610. Auction service 504 includes service interface 612 and service datastore 614. According to the depicted embodiment, browser 602 attempts to read or write state information concerning an auction, such as, for example, reviewing an ongoing auction event, by making a request of auction integration library 604. Auction integration library 604 passes the request to network interface 606 using Json over Http Rest.

In this example, auction integration engine 320 examines the request details and references dispatch table 608 to determine information regarding the service requested in the request details. According to one embodiment, these details may take the form of a request header that includes, among other parameters, a requester identifier, a timestamp, a service identifier and commands for the service. Dispatch table 608 includes information indicating available auction services and the communication preferences of the available services. In one embodiment, dispatch table 608 may include a universal resource locator (URL) associated with the service. Auction integration engine 320 then may use service request interface 610 to pass whatever information the requested service prefers to service interface 612. More specifically, service request interface 610 may use any communication standard, such as, among others, Http Post, Http Get, Soap and Corba, and may marshall and send the request to service interface 612. Auction service 504 then may use service datastore 614 to retrieve or store any information required to perform the requested functionality. In this example, auction service 504 will evaluate the response message from service datastore 614 and use service interface 612 to issue an Http response to network interface 606. Network interface 606 may modify the response Http before sending the response Http to browser 602. In this way, auction integration engine 320 allows for disparate systems to be easily integrated to provide auction services to users.

In the illustrated embodiment, auction integration engine 320 may also provide auction services without calling on additional auction services. For example, in one embodiment, auction integration engine 320 may support any of the functionality of the various web clients shown in FIG. 3, i.e., bidder interface 312, seller interface 314, inventory interface 316 and context data interface 318. In support of web client functionality, auction integration engine 320 may interact with databases 328, 330 and 332 to configure auction events, select inventory for specific auction events, administer seller and bidder accounts, conduct ongoing auction events, settle and clear transactions, store auction results and analyze past auctions, in context, to provide auction parameters designed to increase auction performance.

In one embodiment, auction integration engine 320 may determine eligibility for acceptance of one or more bids based at least in part on a set of acceptance criteria and may record bid eligibility in a database, such as auction database 328. The criteria for eligibility may include various comparisons between bid characteristics and seller requirements and preferences. For example, in an embodiment, these criteria may include consideration of any floor bid that applies to the inventory, the identity of the bidder associated with the bid and the current bids of other bidders. These criteria may be specified by an external entity, such as a user.

In another embodiment, auction integration engine 320 may calculate one or more statistical summaries of a plurality of bids placed during an auction event. This statistical summary may be any summary useful in characterizing the auction bids as a whole, such as an average, weighted average, variance or standard deviation. In this embodiment, auction integration engine 320 may determine eligibility, or ineligibility, for acceptance based at least in part on a comparison between the characteristics of a bid and one or more statistical summaries.

In another embodiment, auction integration engine 320 may determine the presence or absence of a terminating condition for an auction event. If no terminating condition is present, auction integration engine 320 may allow an ongoing auction event to continue. Conversely, if a terminating is present, auction integration engine 320 may close an ongoing auction. In various embodiments, terminating conditions may include, among others, expiration of an auction time limit, i.e. the current time exceeding an indicated, threshold time, or depletion of inventory to auction.

In another embodiment, auction integration engine 320 may settle accepted bids. According to one embodiment, auction integration engine 320 records bids as accepted that are eligible for acceptance after an auction event has closed. This recordation may be made in a database, such as auction database 328. Auction integration engine 320 may settle accepted bids via one or more system interfaces to one or more external systems, such as a payment system. As discussed above, settlement may involve two or more funds transfers, such as a first transfer from the seller to a third party and a second transfer from the third party to the bidders, to protect bidder anonymity.

Figure 4:
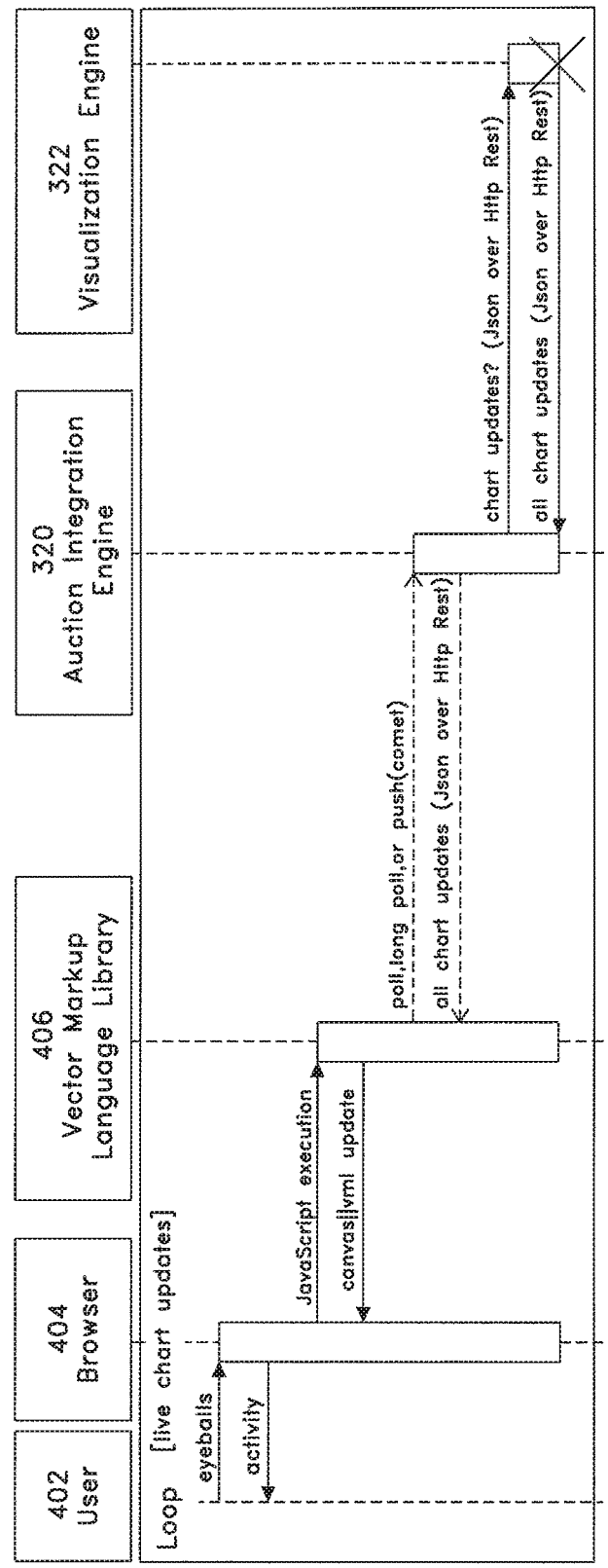
FIG. 4 shows an example information flow according to an embodiment.

With continued reference to FIG. 3, as discussed above, one example of an auction service 504 includes visualization engine 322. In one embodiment, both interfaces 312 and 314 interact with visualization engine 322 to present user interfaces to users. FIG. 4 illustrates an example of the flow of visualization requests according to an embodiment. The embodiment illustrated in FIG. 4 includes browser 404 which exchanges information with vector markup language library 406. In a specific example, a user reviews charts depicting an ongoing auction event via a browser. These charts may include vector based animation. Periodically, the JavaScript embedded in a browser control executes a call vector markup language library 406. In this example, the call is a request to update the chart. Vector markup language library 406 then calls auction integration engine 320 using various asynchronous animation techniques including, for example a poll, a long poll or a COMET push to schedule servicing of a visualization request. According to this example, auction integration engine 320 then calls an interface exposed by visualization library 322 to request chart updates. In the current example, auction integration engine 320 uses Json over Http Rest, but this is not a requirement. In this example, visualization engine 322 then accesses, with reference to FIG. 3, auction database 328 to determine current chart information, processes the current chart information and responds to auction integration engine 320 with updated chart information using Json over Http Rest. Auction integration engine 320 then provides the updated chart information to vector markup language library 406 using Json over Http Rest. In the final step of this example, vector markup language library 406 provides the updated chart information to user 402 via browser 404.

Another example of an auction service 504, according to an embodiment, includes data validation engine 324. Inventory validation engine 324 may include logic that validates various characteristics of inventory information. For example, inventory validation engine 324 may compare an expiration date associated with one or more inventory items to a reference date. Based on this comparison, inventory validation engine 324 may take further action including, among other actions, recording the inventory as expired, rejecting the inventory information, recording the inventory as available for auction, accepting the inventory and subjecting the inventory information to further inspection or comparisons.

According to another embodiment, another example of an auction service 504 includes auction analysis engine 326. Auction analysis engine 326 may mine auction context data & history database 330 for trends, relationships and behavioral correlations. This analysis may examine information internal to the auction history, such as, for example, number and identity of participants, floor bids and quantity and quality of inventory auctioned, as well as information external to the auction history, such as auction context data. The external information may be entered via a user interface or imported through a system interface from various external entities, including stock exchanges, company analysts, credit agencies, news companies and governmental bodies.

In one embodiment, auction analysis engine 326 may analyze statistically summarized data as well as unsummarized data. In one exemplary embodiment, auction analysis engine may calculate and store a correlation coefficient that describes a relationship between the current stock price of a bidder and the amount, number and frequency of that bidder's bids. In another embodiment, auction analysis engine 326 may determine a correlation between a bidder's maximum bid amount and the bidder's current credit rating. Thus auction analysis engine 326 may provide insight into how auction parameters and external pressures influence bidder behavior.

In other embodiments, auction analysis engine 326 may protect the anonymity of bidders and their associated bids by creating groups sufficiently large enough to hide the identity of specific bidders and their associated bids. In these embodiments, auction analysis engine 326 may group bidders according to common demographic or other features. Auction analysis engine 326 may then calculate summaries for these groups of bidders and may remove the unsummarized data from the system.

As discussed above, FIG. 3 also illustrates several web clients including bidder interface 312. Bidder interface 312 may enable an external entity to perform a variety of functions including administering user and bidder account information, registering for specific auction events, placing bids at specific auctions, receiving bid eligibility margins and other information pertaining to ongoing auctions and consummate transactions. In various embodiments, bidder interface 312 may include a user interface that presents an indication as to whether particular bids are eligible for acceptance by the seller. Additionally, the user interface may present a representation of a margin by which bids are eligible for acceptance. Conversely, the user interface may present a representation of a margin by which bids are not eligible for acceptance. To perform its functionality, bidder interface 312 may interact with auction integration engine 320 and various auction services via auction integration engine 320.

The web clients illustrated in FIG. 3 also include seller interface 314. Seller interface 314 may enable an external entity to perform various functions including administering user and seller account information, configuring specific auction events, indicating inventory to auction at an event, indicating a floor price for inventory, evaluating past auction history and performance. In other embodiments, seller interface 314 may allow an external entity to adjust auction event parameters both after creation of the auction event and during conduct of the auction event. In another embodiment, seller interface 314 may configure the criteria used to determine bid eligibility for acceptance. Additionally, seller interface 314 may configure the behavior of the representation that indicates the margin by which bids are eligible for acceptance. To execute its prescribed functions, seller interface 314 may interoperate with various auction services via auction integration engine 320. For example, in one embodiment, seller interface 314 may display auction history information, in context, and may present suggested auction parameters to a user. These suggested auction parameters may be formulated to achieve specific performance goals for an auction.

The web clients shown in FIG. 3 also include inventory interface 316. In various embodiments, inventory interface 316 may enable an external entity to perform sundry functions including administering inventory information such as the inventory information discussed above with regard to inventory database 332. In the depicted embodiment, inventory interface 316 is a system interface through which other systems may provide inventory information. In other embodiments, inventory interface 316 is a user interface or is a combination of a system interface and a user interface.

As shown in the exemplary embodiment, inventory interface 316 may exchange data with auction integration engine 320 while populating inventory database 332 with information via data validation engine 324.

The last of the web clients depicted in FIG. 3 is context data interface 318. Context data interface 318 may enable an external entity to perform a variety of functions including managing auction context data such as the auction context data described above with regard to auction context & history database 330. In the embodiment shown, context data interface 318 is a system interface through which other system may provide auction context information. As with other system elements that exchange information with external entities, context data interface 318 may poll other systems for information or may receive information from an external entity that pushes the information to context data interface 318. In other embodiments, context data interface 318 is a user interface or is a combination of a system interface and a user interface. As shown in the exemplary embodiment of FIG. 3, context data interface 318 may exchange data with auction integration engine 320 while populating auction context & history database 330 with information via auction analysis engine 326.

Dynamic Discounting Embodiments

According to various embodiments, auction system 222 may be used to conduct auctions wherein sellers are debtors who are obligated to pay cash to bidders. In these embodiments, bidders bid for payment, at an indicated date and time, of the obligated debt by proposing a discount in exchange for the payment. The formulation of useful systems and methods for conducting these auctions is impacted by the unique manner in which auction system 222 may be structured and organized. Conversely, the context, inventory and likely participants of this novel type of auction impact the attributes and facilities of this embodiment of auction system 222.

According to one embodiment, seller interface 314 may enable a seller of payment of short term A/P to conduct an online, electronic auction for early payment of their obligations. For example, a company may have short term trade debt obligating the company to pay one or more suppliers at a future point in time. Within this context, the company may wish to expedite payment in exchange for a discounted payment amount.

In another embodiment, seller interface 314 may enable a seller of payment of payroll to conduct an online auction for early delivery of paychecks to employed entities. For example, an employer company may have accrued obligations to pay employees, independent contractors, consultants or other persons who have performed work on behalf of the company. These accrued obligations may include hourly wages, salary, benefits or other expenses. As with short term A/P, the company may wish to expedite payment in exchange for a discounted payment amount.

Figure 7:
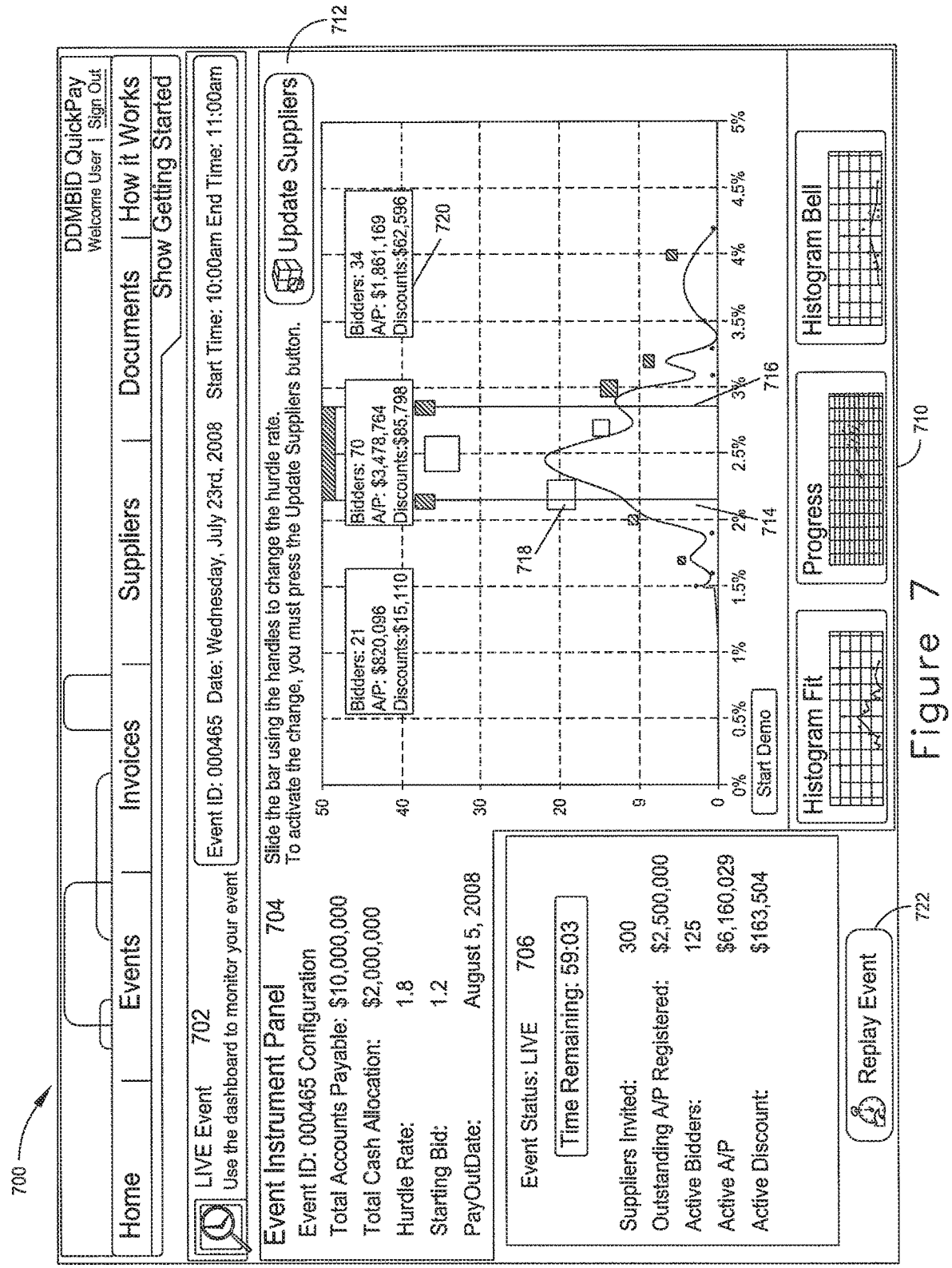
FIG. 7 depicts an example interface through which a user may submit monitor an auction according to an embodiment.

According to various embodiments, seller interface 314 may provide functionality through a variety of user interface screens and elements. FIG. 7 illustrates an example of a user interface 700 that may be included in seller interface 314 according to some embodiments. User interface 700 may be used by a seller to monitor an ongoing, or "live," payment auction event. User interface 700 may include an event title section 702, an event instrument panel section 704 and an event status section 706. Event instrument panel 704 may include a current chart 708, available charts 710 and update suppliers element 712. Current chart 708 may include a first hurdle rate indicator 714, a second hurdle rate indicator 716, payment block 718, range summary 720 and replay element 722.

According to one embodiment, the elements of user interface 700 may function as follows. Event title section 702 may present identification and logistical information regarding an auction event. In the pictured embodiment, event title section 702 displays information including an identifier for an event ("Event ID") the date upon which the event is being conducted ("Date") the time when the event will start ("Start Time") and the time when the event will end ("End Time").

According to the illustrated embodiment, user interface 700 may include event instrument panel 704. Event instrument panel 704 may present configuration information regarding a payment auction event and may receive requests to alter the configuration information while the event is underway. In the depicted embodiment, the configuration information displayed may include an identifier for an event ("Event ID"), a total amount of debt ("Total Accounts Payable"), a goal amount of debt to be retired ("Total Cash Allocation"), a first hurdle rate ("Hurdle Rate"), a floor bid ("Starting Bid"), and a time at which payment will be made ("PayOutDate") and a bid increment (not shown).

In alternative embodiments, the label for the amount of debt ("Total Accounts Payable") may be changed to a label suitable for other types of payment inventory. For example, in an embodiment where the inventory to be auctioned includes payment of payroll checks, the label may be changed to "Total Payroll." Thus, embodiments of seller interface 314 may be tailored to the type of inventory subject to auction.

In the depicted embodiment, event instrument panel 704 may also display information regarding the current performance of an auction event within current chart 708. As illustrated, current chart 708 lists payment amounts along the y-axis and discount rates along the x-axis. Current chart 708 shows multiple payment blocks, for example payment block 718, that represent a collection of one or more bids for an amount of debt to be paid. These payment blocks may also represent a discount rate associated with one or more bids.

As shown, current chart 708 is segmented into three ranges by first hurdle rate indicator 714 and second hurdle rate indicator 716. These ranges may indicate an eligibility for acceptance by the seller of bids that fall substantially within their bounds. In some embodiments, these ranges may additionally indicate a margin of eligibility and in the illustrated embodiment these ranges define two such margins, i.e. a first margin for bids that fall substantially between the first hurdle rate indicator 714 and second hurdle rate indicator 716, and a second margin for bids that fall substantially above the second hurdle rate indicator 716.

In another embodiment, the ranges may indicate a margin of ineligibility. For example, in the illustrated embodiment, a first margin of ineligibility may be defined for bids that fall substantially below the first hurdle rate indicator 714 and a second margin of ineligibility may be defined for bids that fall substantially between the first hurdle rate indicator 714 and the second hurdle rate indicator 716. In this embodiment, bids that fall substantially above second hurdle rate indicator 716 may be eligible for acceptance.

Additionally, as shown, current chart 708 may also include range summaries, such as range summary 720. The range summaries may present various information regarding the bids substantially encompassed within them, including, among other information, the number of bidders ("Bidders"), the total amount of debt bid ("A/P") and the amount of discount bid ("Discount"). In this example, current chart 708 displays first and second hurdle rate indicators 714 and 716 as separate, distinct colors and displays payment blocks that fall substantially within the ranges as separate, distinct colors. These color designations may help a user identify into which range each block substantially falls.

In an alternative embodiment, directed toward payroll debt, the label for the amount of debt bid ("A/P") may be changed to a label suitable for payroll payment inventory. For example, in one embodiment, the label may be changed to "Payroll." Other embodiments may include other labels without departing from the scope of the present invention.

In various embodiments, event instrument panel 704 may receive a request to alter first hurdle rate 714 or second hurdle rate 716. In response to this request, event instrument panel 704 may update the elements of user interface 700, including current chart 708 and event status 706, to illustrate how the requested change would affect the event, if the change were to be made effective. For example, event instrument panel 704 may receive a request to change first hurdle rate 714 from 1.8 to 2.5. In response, event instrument panel 704 may change the first hurdle rate listed in event instrument panel 704 to 2.5. Event instrument panel 704 may also move the first hurdle rate indicator 714 to 2.5. Moreover, event instrument panel 704 may alter payment block 718 to the color red. In addition, event instrument panel 704 may update the amount of active discount listed in event status 706.

In the illustrated embodiment, user initiated changes may be made effective by actuation of update suppliers element 712. In response an actuation of update suppliers element 712, user interface 700 may cause auction database 320 to be updated with the requested change. This update event may, in turn, cause actions within other system elements. For example, bidder interface 312 may be updated to notify bidders of the current status of their bids, as is discussed further below.

In an alternate embodiment, event instrument panel 704 may receive a request to automatically alter one or more hurdle rates to achieve one or more auction performance goals. For example, a seller may request that event instrument panel 704 automatically alter hurdle rates throughout an auction event to maximize the discount amount gained, while retiring at least an amount of debt specified by a goal. In other example, a seller may request that event instrument panel 704 modify any auction parameter to maximize the discount amount gained, while retiring all debt that is due on an indicated date. As with user initiated changes to auction parameters, changes made to auction parameters while running in this "auto-pilot" mode may cause other actions to be performed by the various elements of auction system 222, for example, data may be modified and other user interfaces, such as bidder interface 312, may be updated. When operating in auto-pilot mode, event instrument panel 704 may also automatically update the elements of user interface 700 to allow a seller to track auction performance.

In an embodiment, seller interface 314 may determine optimal auction parameters at least in part with reference to a current market rate. The current market rate may be a statistical summary of the bids placed during an auction event. In another embodiment, seller interface 314 may determine optimal auction parameters based at least in part on the identity of participants and historical auction performance, such as the historical performance included in auction context data & history database 330.

Additionally, as shown, various embodiments including event instrument panel 704 may provide for a variety of data representation methods, such as several graphs and charts. For example, available charts 710 may include "Histogram Fit," "Progress" and "Histogram Bell." In this way, event instrument panel 704 may provide representations that suit a variety of user preferences.

Returning to the illustrated embodiment, user interface 700 may include event status section 706. Event status section 706 may present status information regarding an auction event. In the pictured embodiment, event status section 706 displays information including a status indicating whether the auction event is "LIVE" or "COMPLETED" ("Event Status"), an amount of time remaining in the auction event ("Time Remaining"), a number of bidders who are invited to participate in the auction ("Suppliers Invited"), an amount of outstanding debt obligations for which the participates are invited to place bids ("Outstanding A/P Registered"), a number of active bidders ("Active Bidders"), an amount of debt owed to the active bidders ("Active A/P") and an amount of discount derived from bids eligible for acceptance.

In an another embodiment, directed toward payroll debt, the label for the number of bidders who are invited to participate in the auction ("Suppliers Invited") may be changed to a label suitable for payroll payment inventory. For example, in one embodiment, the label may be changed to "Employees." Similarly, the labels for the amount of outstanding debt obligations for which participates are invited to place bids ("Outstanding A/P Registered") and the amount of debt owed to the active bidders ("Active A/P") may be replaced with "Outstanding Payroll Registered" and "Active Payroll," respectively. Other embodiments may include other labels without departing from the scope of the present invention.

In the embodiment shown, a user may request replay of a completed auction event by actuation of replay element 722. In response to an actuation of replay element 722, user interface 700 may present a variety of time lapsed views of an auction event. For example, user interface 700 may display a condensed version of the auction that replays, in one minute, an auction with an original duration of one hour. In other embodiments, users may manipulate playback of auctions as they would any form of media supported by conventional media views. Available manipulations may include play at normal speed, play a decreased speed, play at increased speed, pause playback, skip to a specific point in the playback, etc.

According to another embodiment, bidder interface 312 may enable a bidder holding an account receivable with a seller to place bids in pursuit of payment at an indicated time. For example, a supplier of a company may hold short term trade debt obligating the company to pay the supplier at a future point in time. Within this context, the supplier may wish to expedite payment in exchange for a discounted payment amount.

In another embodiment, buyer interface 312 may enable a bidder owed wages from a seller to place bids in pursuit of payment of at an indicated time. For example, an employee or independent contractor may be owed salary, hourly wages or expenses from a company. As with short term accounts receivable, the bidder may wish to expedite payment in exchange for a discounted payment amount.

In an embodiment directed toward payroll debt, buyer interface 312 may implement a non-competitive bidding method. According to this embodiment, buyer interface 312 may present a daily discount rate to the bidder. The bidder may accept or reject the discount rate by entering an amount of payroll debt that the bidder is willing discount by the specified discount rate, in exchange for payment of the payroll debt at an indicated date and time.

According to various embodiments, buyer interface 312 may provide functionality through a variety of user interface screens and elements. FIG. 8 illustrates an example of a user interface 800 that may be included in seller interface 312 according to some embodiments. FIG. 8 illustrates a user interface 800 that may be used by a bidder to monitor an ongoing, or "live," payment auction event. User interface 800 may include an event title section 802, a bid status section 804 and a bid placement section 806. Bid status section 804 may include bid status indicator 812. Bid placement section 806 may include a bid entry element 808 and a bid placement element 810.

According to one embodiment, the elements of user interface 800 may function as follows. Event title section 802 may present identification and logistical information regarding an auction event. In the pictured embodiment, event title section 802 displays information including an identifier for an event ("Event ID") the date upon which the event is being conducted ("Date") the time when the event will start ("Start Time") and the time when the event will end ("End Time").

According to the illustrated embodiment, user interface 800 may include bid status section 804. Bid status section 804 may present status information regarding a currently active bid. This status information may include, among other information, whether or not a current bid is eligible for acceptance by a supplier ("Bid Status") and a remaining duration of the auction event ("Time Remaining"). In the depicted embodiment, the status information displayed may include bid status indicator 812 that indicates whether the active bid is eligible for acceptance by the seller. The status information displayed may also indicate a margin by which an active bid is eligible, or ineligible.

More particularly in regard to embodiment as shown in FIG. 8, the status information may indicate that the current bid is not eligible, eligible by a relative small margin or eligible by a relatively large margin. In some embodiments, these margin classifications may be indicated by discrete, separate colors and in one embodiment these categories are indicated by red, yellow and green, respectively. In another embodiment, the margin classifications may be related to the ranges discussed above with regard to seller interface 314. Thus, changes to the ranges may result in a change to the status indicator. For example, if the seller in the auction event depicted in FIG. 8 were to increase the first hurdle rate to 3%, the bidder's current bid of 2.8% would fall below the first hurdle rate. As a result, the bidder's current bid would not be eligible for acceptance by the seller, and bid status indicator 812 would be colored red.

As illustrated in this embodiment, the bid status indicator 812 may include a trend arrow that indicates a comparison between the current bid and other bids within the same margin. According to one embodiment, a trend arrow that is pointing up may indicate that the current bid is favorably positioned vis-a-vis other bids in the same margin. A trend arrow that is pointing down may indicate that the current is unfavorably positioned vis-a-vis other bids in the same margin. Favorability may be determined in variety of ways according to various embodiments, and in the depicted embodiment, it may be determined with reference to the midpoint of all bids within the indicated margin. For example, in the illustrated embodiment, the midpoint of the margin associated with the color yellow is below 2.8, and thus the trend arrow is pointing up.

According to depicted embodiment, user interface 800 may include bid placement section 806. Bid placement section 806 may present the current debt and bid information and may receive new bid information. The current debt and bid information may include, among other information, the current bid discount rate ("Your current bid") and the total amount of debt eligible for payment ("Your Invoice Total for the Event").

In an another embodiment, directed toward payroll debt, the label for the total amount of debt eligible for payment ("Your Invoice Total for the Event") may be changed to a label suitable for payroll payment inventory. For example, in one embodiment, the label may be changed to "Your Payroll Total for the Event." Other embodiments may include other labels without departing from the scope of the present invention.

In this embodiment, bid placement section 806 may receive new bid information via bid entry element 808. Additionally, bid placement section may place a new bid, thus making it the current bid for the bidder, by receiving an actuation of bid placement element 810. In response to an actuation of bid placement element 810, user interface 800 may cause auction database 320 to be updated with the requested bid. This update event may, in turn, cause actions within other system elements. For example, seller interface 314 may be updated to notify a seller of the current status of the bidders bid, as is discussed above.

While the depicted example includes three ranges and two margin classifications, other embodiments may have few or greater numbers of ranges and margins. Additionally, while the illustrated embodiment presents a particular relationship between the ranges and margins classifications, other embodiments may relate these devices in other ways. For example, in one embodiment, several ranges may be consolidated into one margin classification.

Each of the interfaces disclosed herein exchange information with various providers and consumers. These providers and consumers may include any external entity including, among other entities, users and systems. In the exemplary embodiment illustrated in FIG. 3, users may exchange information with the bidder interface 312 and seller interface 314. In an alternative embodiment, this information may be exchanged with other applications or storage media using system interfaces exposed by each of these elements. Conversely, in the exemplary embodiment illustrated in FIG. 3, systems may exchange information with inventory interface 316 and context data interface 318. In an alternative embodiment, this information may be exchanged with users using user interfaces exposed by these elements. Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the system or unauthorized access to the system.

Auction Processes

Figure 9:
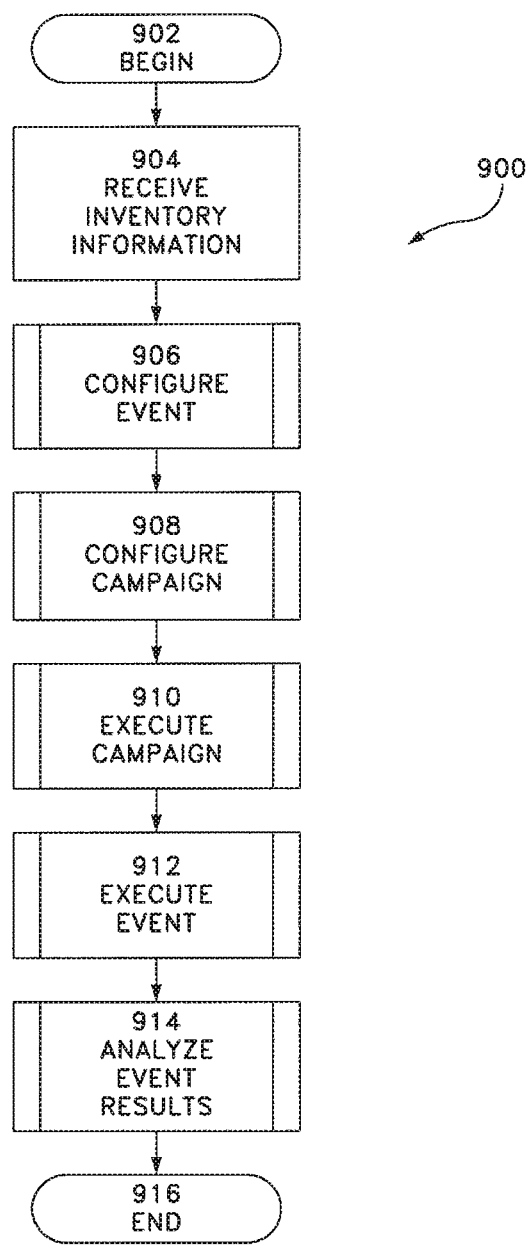
FIG. 9 illustrates an example process for conducting and analyzing an auction according to an embodiment.

Various embodiments provide processes for conducting and analyzing an auction. FIG. 9 illustrates one such process 900 that includes acts of receiving inventory information, configuring an auction event, configuring an event campaign, executing the event campaign, executing the auction event and analyzing the auction event. Process 900 begins at 902.

In act 904, inventory information is received. According to one embodiment, inventory information may be received by inventory interface 316 and stored in inventory database 332. In an embodiment, the inventory information may be associated with one or more potential bidders. In the context of a payment auction, process 900 may restrict bidding so that only authorized creditors may bid down debt owed to them.

In act 906, an auction event is configured. According various embodiments, auction events may be configured to include one or more sellers, bidders and inventory. Acts in accord with these embodiments are discussed below with reference to FIG. 10.

In act 908, an event campaign is configured. According to some embodiments, event campaigns may be configured to recruit bidders to participate in auction events. Acts in accord with these embodiments are discussed below with reference to FIG. 11.

In act 910, the event campaign is executed. According to other embodiments, event campaigns may be conducted to notify potential bidders of an upcoming auction event. Acts in accord with these embodiments are discussed below with reference to FIG. 12.

In act 912, the auction event is executed. According to some embodiments, auction events may be conducted to sell inventory to multiple bidders. Acts in accord with these embodiments are discussed below with reference to FIG. 13.

In act 914, the auction event is analyzed. According to a variety of embodiments, auction events may be analyzed to forecast participant behavior in future auctions. Acts in accord with these embodiments are discussed below with reference to FIG. 14.

Process 900 ends at 916.

Figure 10:
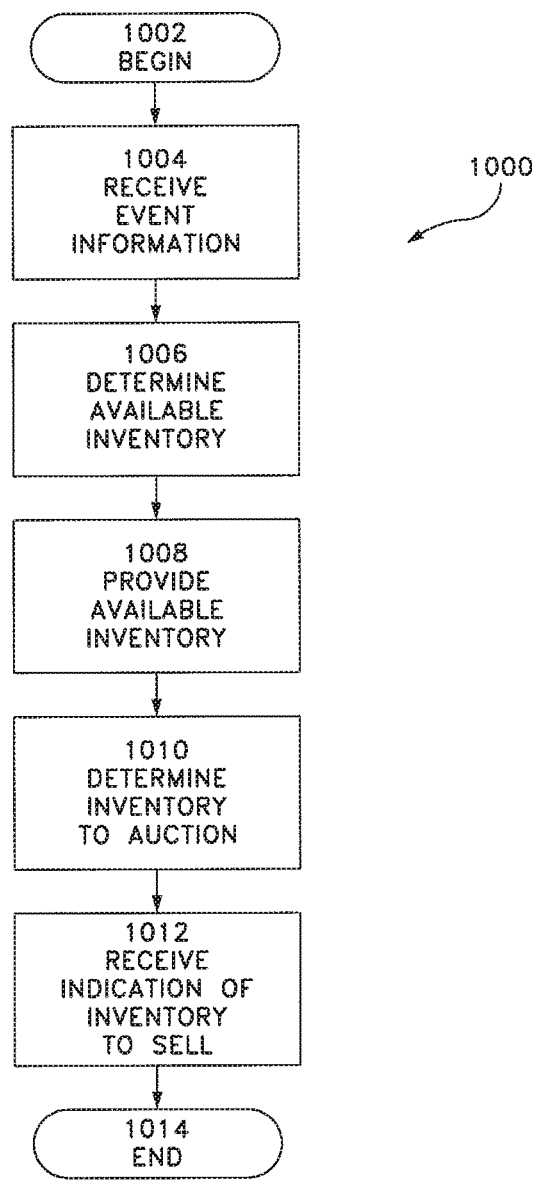
FIG. 10 depicts an example process for configuring an auction according to an embodiment.

Various embodiments provide processes for configuring an auction event. FIG. 10 illustrates one such process 1000 that includes acts of receiving event information, determining available inventory, providing an indication of the available inventory, determining inventory to auction and receiving an indication of inventory to auction. Process 1000 begins at 1002.

In act 1004, event information is received. The event information may include any information that describes an auction event. For example, in one embodiment, event information includes the event configuration and logistical information discussed above with regard to auction database 328. In one embodiment, this event information may be received using seller interface 314 and stored in auction database 328.

In act 1006, available inventory is determined. According to one embodiment, the availability of inventory is determined through the application of business rules. For example, in the context of a payment auction, unpaid debt that is due before the start date and time of the event may be recorded as unavailable for payment. In another example, debt associated with particular bidders, such as bidders who are no long active suppliers or that have delivered unsatisfactory goods or services, may be recorded as unavailable for payment. In another embodiment in the context of a payroll auction, unpaid payroll debt and expense items associated with bidders who are no longer associated with the company may be recorded as unavailable for payment. In one embodiment, payment of debt that is recorded as unavailable for payment may be excluded from the payment inventory. In other embodiments, these business rules may be applied by an element of auction system 222, such as seller interface 314. In an alternative embodiment, the business rules may be applied by a user and effected through an interface, such as seller interface 314.

In act 1008, an indication of the available inventory is provided. According to an embodiment directed toward payment auctions, the indication may include, among other information, an identifier of the debt, a date when notice of the debt was received, a requested payment date, whether payment of the debt has been authorized, a debt amount, a preferred method of payment, a creditor associated with the debt and comments regarding the debt or the creditor. Additionally, according to an embodiment, the indication may be presented as part of a user interface, such as seller interface 314, that enables a user to indicate debt to be auctioned as part of an event. According to another embodiment the debt may be an invoice and notification of the debt may take the form of a voucher. In an embodiment directed toward payment of payroll debt, the debt may be accumulated wages of an hourly employee and notification of the debt may be in the form of an hourly timecard.

In act 1010, inventory to include in the auction is determined. According to one embodiment, this determination may be based at least in part with reference to previous auction performance information, such as, for example, the information contained in auction context data & history database 330. In another embodiment, seller interface 314 may suggest inventory to include based on auction performance goals indicated by a seller. In an embodiment directed toward payment auctions, these auction performance goals may include, among other goals, maximization of debt discount. Other goals, such as maximization of the yield on a specified amount of allocated cash, may be considered. In an embodiment directed toward payment auction, characteristics of an entity associated with debt may be used to determine inventory to include. For example, in an embodiment directed toward payroll payment, payment of employee debt may be included in inventory over payment of independent contractor debt.

In act 1012, an indication of inventory to auction is received. In one embodiment, an association between the indicated inventory and the auction event is recorded. This association may be stored, for example, within auction database 328. According to another embodiment, the indication is received from any external entity using an interface, such as seller interface 314.

Process 1000 ends at 1014.

Figure 11:
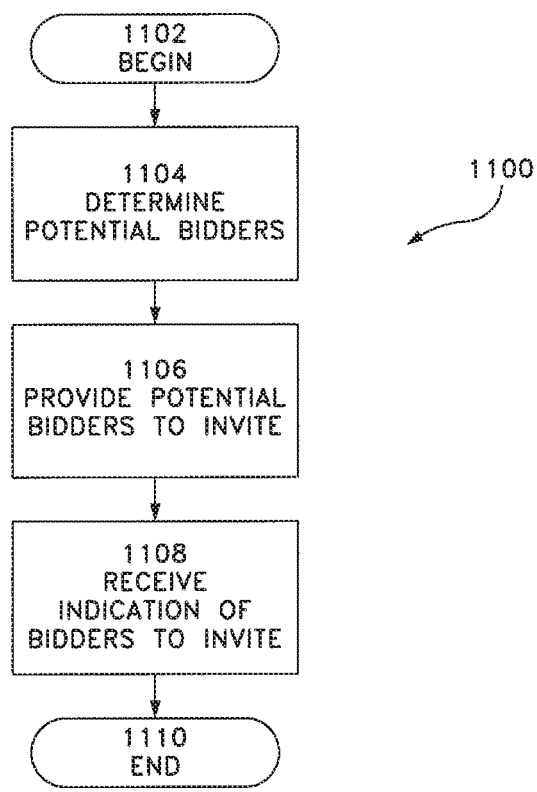
FIG. 11 shows an example process for configuring an auction campaign according to an embodiment.

Various embodiments provide processes for configuring an auction campaign. An auction campaign is a process that includes acts that attempt to persuade potential bidders to join an auction event. FIG. 11 illustrates one such process 1100 that includes acts of determining potential bidders, providing an indication of the potential bidders and receiving an indication of bidder to invite. Process 1100 begins at 1102.

In act 1104, potential bidders are determined. According to one embodiment, this determination may be based at least in part with reference to previous auction performance information, such as, for example, the information contained in auction context data & history database 330. According to an embodiment in the context of a payment auction campaign, potential bidders may include bidders whose debt has been associated with an auction event. In at least one embodiment, this determination may be made by an element of auction system 222, such as seller interface 314. For example, seller interface 314 may evaluate auction context data & history database 330 to determine that certain employees tend to participate in payroll payment auctions early in the calendar year.

In act 1106, an indication of the potential bidders is provided. According to an embodiment, the indication may include, among other information, the name of the bidder, a category to which the bidder belongs and a preferred method of contacting the bidder. In an embodiment directed toward a payment auction, the indication may include a total amount of debt owed to the bidder, the number of debt instruments owed to the bidder and an average amount for the debt instrument owed to the bidder. According to another embodiment, the debt instruments may be invoices for payment of short term trade obligations. In addition, according to an embodiment, the indication may be presented as part of a user interface, such as seller interface 314, that enables a user to indicate creditors to invite to the event. Continuing the previous example, seller interface 314 may provide, to a user, a list of the employees who tend to participate in payroll payment auctions early in the calendar year.

In act 1108, an indication of bidders to invite is received. In one embodiment, an association between the indicated bidders and the auction event is recorded. This association may be stored, for example, within auction database 328. According to another embodiment, the indication is received from any external entity using an interface, such as seller interface 314. Finishing the previous example, the user may indicate, through seller interface 314, that each employee on the list of employees should be invited to an auction event scheduled for January 14.

Process 1100 ends at 1110.

Figure 12:
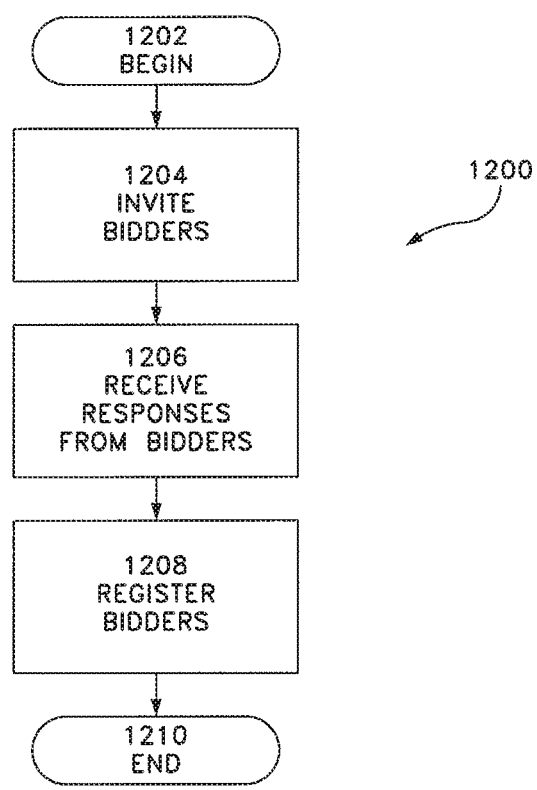
FIG. 12 illustrates an example process for executing an auction campaign according to an embodiment.

Various embodiments provide processes for executing a payment auction campaign. FIG. 12 illustrates one such process 1200 that includes acts of inviting bidders, receiving responses from bidders and registering interested bidders. Process 1200 begins at 1202.

In act 1204, bidders are invited. In various embodiments, the bidders may be invited in a variety of ways using various methods. For example, according to one embodiment, the invitation may take the form of an email. In another embodiment, the invitation may be a telephone call. Additionally, the invitation may include varying amounts of information regarding the event. For example, in one embodiment, the invitation may include information regarding the inventory targeted for auction. In an embodiment directed toward a payment auction, the invitation may include a goal for the amount of debt to retired according to the terms of the auction, the amount of debt owed to the invitee and other event configuration or logistical information. In an embodiment directed toward payment of short term A/P, suppliers may be invited to a payment auction using a company extranet.

In act 1206, responses from bidders are received. According to one embodiment, the responses may include an indication as to whether the bidder plans to participate in the event. In one embodiment, the indication may be recorded for future reference in a database, such as auction database 328. In another embodiment, the bidders may respond through an interface such as bidder interface 312. In an embodiment directed toward payment of payroll debt, employees may be invited to a payment auction using a company intranet.

In act 1208, interested bidders are registered. According to one embodiment, interested bidders are registered by recording an association between the bidder and the event for which the bidder is registered. This association may be recorded for future reference in a database, such as auction database 328.

Process 1200 ends at 1210.

Figure 13:
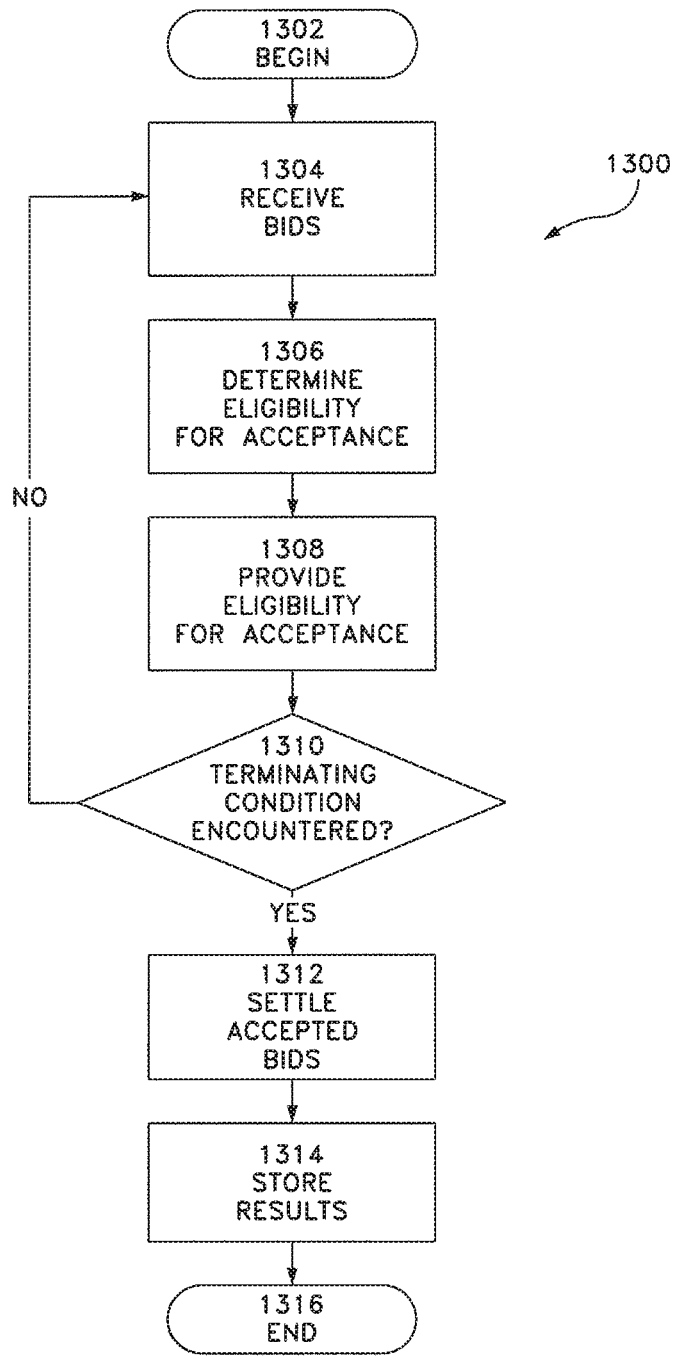
FIG. 13 depicts an example process for executing an auction according to an embodiment.

Various embodiments provide processes for executing a payment auction event. FIG. 13 illustrates one such process 1300 that includes acts of receiving bids, determining an eligibility of acceptance for bids, providing an indication of the eligibility of bids, determining the presence or absence of a terminating condition, settling accepted bids and storing auction event results. Process 1300 begins at 1302.

In act 1304, bids are received. According to an embodiment, bids may include a bid amount and an indication of the debt to which the bid applies. In an embodiment directed toward payment auctions, a bid may include a discount rate or a discount amount and an indication of the debt to which the bid applies. According to one embodiment, bids may be received via a user interface, such as bidder interface 312. Received bids may be recorded in a database, such as auction database 328. For example, in an embodiment directed toward payroll payment auctions, the bids may be received from employees who are interested in early payment of bonus income owed to them.

In act 1306, eligibility for acceptance is determined for bids. According to an embodiment, the eligibility for acceptance of bids from multiple bidders may be determined. In an embodiment directed toward a payment auction, the eligibility for acceptance may be determined with reference at least in part to the one or more hurdle rates or current market rates. In one embodiment, a bid may be eligible for acceptance if the discount rate associated with the bid is greater than a hurdle rate. In another embodiment, one or more statistical summaries may be used to determine a current market rate. In this embodiment, any bid with a discount rate greater than the market rate may be eligible for acceptance. Additionally, according to an embodiment, a margin by which bids are eligible, or ineligible, may also be determined. The eligibility for acceptance of bids, and any applicable acceptance margin, may be recorded in a database, such as auction database 328. For example, in an embodiment directed toward A/P payment auctions, suppliers may place bids with different discount rates on separate invoices and may be notified that one of the bids is eligible for acceptance while the other is not.

In act 1308, an indication of the eligibility of bids is provided. According to one embodiment, the indication may identify eligible or ineligible bids and may indicate a margin by which bids are eligible, or conversely, a margin by which they are not eligible. In one embodiment, this indication may be provided by both seller interface 314 and bidder interface 312. Seller interface 314 may provide the indication in the form of a summary, or aggregate, of bids. For example, in an embodiment directed toward payroll payment auctions, seller interface 314 may provide an employer with a list of independent contractors who are currently eligible for early payment of their payroll checks.

In act 1310, the presence or absence of a terminating condition is determined. According to one embodiment, the absence of a terminating condition allows an auction to continue, i.e. the process returns to act 1304. Conversely, the presence of a terminating condition may cause the action to cease operation, i.e. the process progresses to act 1312. The presence or absence of a terminating condition may be recorded in a database, such as auction database 328.

In various embodiments, terminating conditions may include expiration of an auction time limit, i.e. transgression of a threshold time, or depletion of inventory to auction. In an embodiment directed toward a payment auction, a terminating condition may be determining that the total payment amount of bids eligible for acceptance substantially equals an auction goal indicating an amount of debt to be extinguished or the amount of payment to be made. In another embodiment directed toward a payment auction, a terminating condition may be determining that the total discount amount of bids eligible for acceptance substantially equals an auction goal indicating a total amount of discount to be gathered.

In act 1312, accepted bids are settled. According to an embodiment, bids that are eligible for acceptance may be accepted by the seller. Accepted bids may then be settled via a system interface to one or more external systems, such as a payment system. In an embodiment directed toward a payment auction, the debt associated with accepted bids may be scheduled for payment from a payment system according to the terms of the accepted bid. For example, in an embodiment directed toward payroll payment auctions, an employer may directly deposit a payroll check into the account of an employee upon acceptance of the employee's bid.

In another embodiment, accepted bid may be settled through a financial intermediary. In this embodiment, a system interface to an external system, such as a payment system, may request that a seller settle accepted bids by providing a single payment to the financial intermediary. The financial intermediary, in turn, may pay each bidder according to the terms of their bid. This settlement process may both easy the administrative burden of settling accepted bids on the seller and protect bidder anonymity.

In act 1314, results of an auction event are stored. According to one embodiment, the results of the auction event may be stored in a database, such as auction database 328. According to another embodiment, any information associated with the auction may be stored in a separate database, such as auction context data & history database 330.

Process 1300 ends at 1316.

Figure 14:
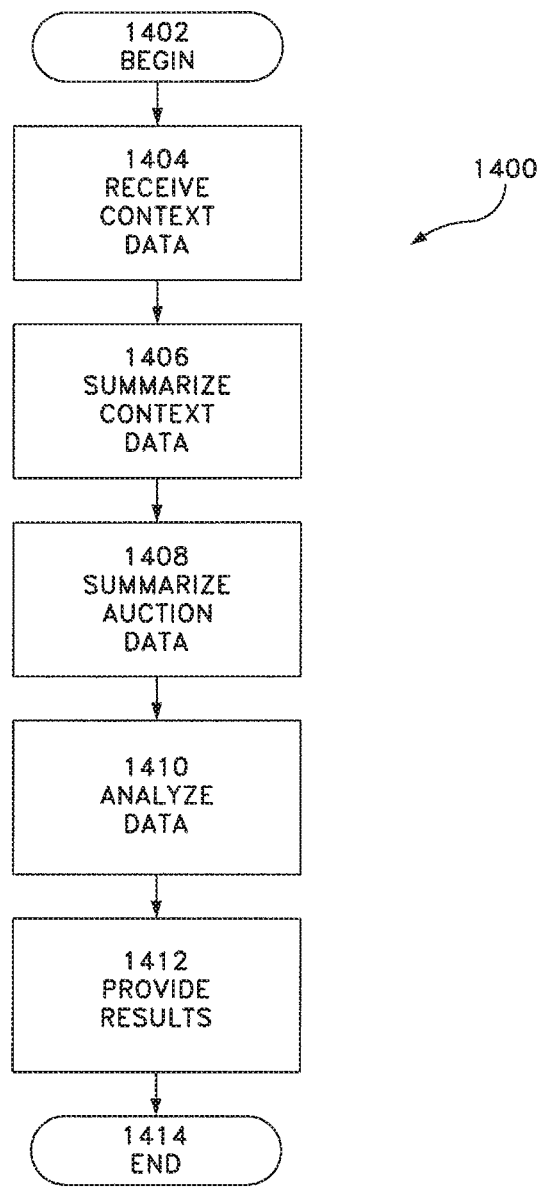
FIG. 14 shows an example process for analyzing an auction according to an embodiment.

Various embodiments provide processes for analyzing a payment auction event. FIG. 14 illustrates one such process 1400 that includes acts of receiving context data, summarizing context data, summarizing auction data, analyzing context data and auction data and providing results of the data analysis. Process 1400 begins at 1402.

In act 1404, context data is received. According to an embodiment, this context data may include any current or past data that may affect the conduct of auction participants or from which future conduct of auction participants may be discerned. According to one embodiment, context data interface 318 may receive context data from external entities and may store the context data in a database, such as auction context data & history database 330.

In act 1406, context data is summarized. According to an embodiment, these summarizes may be any summary that provides an accurate characterization of the underlying context data. Thus, these summaries may include, among others, any of the summaries discussed above with regard auction context data & history database 330.

In act 1408, auction data is summarized. According to an embodiment, these summaries may be any summary that provides an accurate characterization of the underlying context data. Thus, these summaries may include, among others, any of the statistical summary techniques discuss above with regard auction context data & history database 330.

In act 1410, the context data and the auction data are analyzed. This analysis may employ a variety of data mining techniques and may seek to determine trends and relationships within and between context data and auction data. The analysis may focus on summarized data as well as unsummarized data. In one exemplary embodiment, a correlation coefficient may be calculated and stored that describes a relationship between the current stock price of a bidder and the amount, number and frequency of that bidder's bids. In another embodiment, a correlation between a bidder's maximum bid amount and the bidder's current credit rating may be determined. In another embodiment, a correlation between an employee's maximum bid and the employee's tenure with the company may be determined. In still another embodiment, these summarizes may be calculated for groups of bidders with common characteristics, rather than individual bidders, to protect bidder anonymity.

In act 1412, results of the data analysis are provided. According to various embodiments, the results may be included in a variety of presentations, such as graphs and charts. Additionally the results may be provided in the form of auction parameters suggested to enhance auction performance.

Process 1400 ends at 1414.

Figure 15:
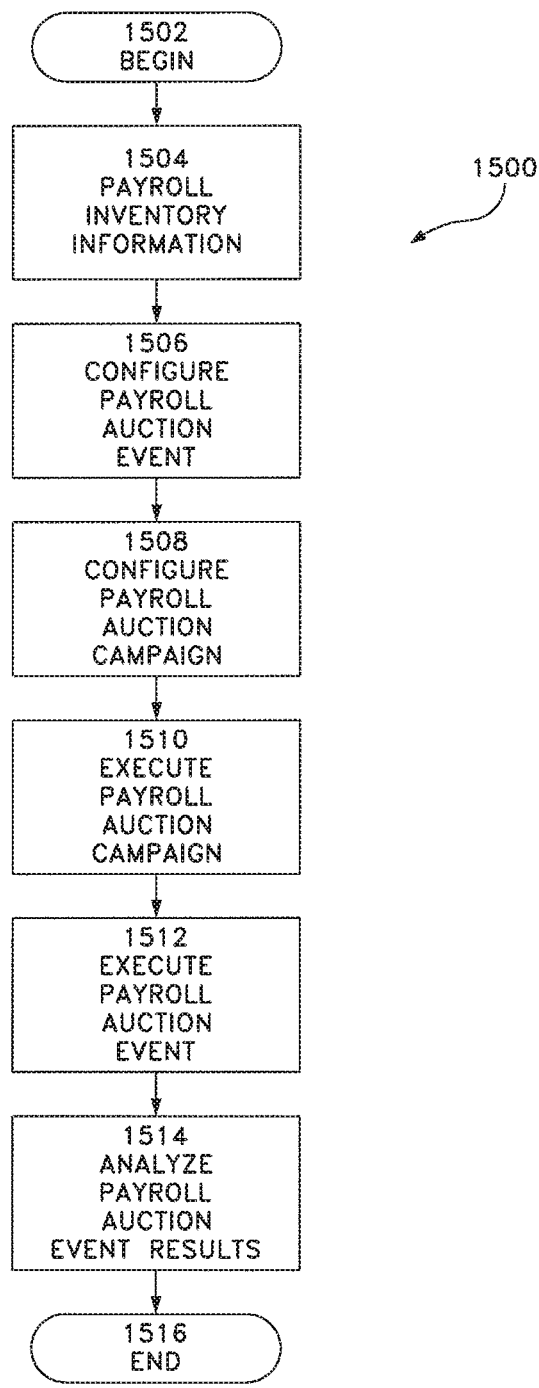
FIG. 15 illustrates an example process for conducting and analyzing an auction according to an embodiment.

FIG. 15 illustrates a process 1500 that includes acts of receiving payroll inventory information, configuring a payroll auction event, configuring a payroll auction event campaign, executing the payroll auction event campaign, executing the payroll auction event and analyzing the payroll auction event. Process 1500 begins at 1502.

In act 1504, payroll inventory information is received. According to one embodiment, payroll inventory information may be received by inventory interface 316 and stored in inventory database 332. In this embodiment, debt information may be received from an external payroll and expense tracking system.

In act 1506, a payroll auction event is configured. According various embodiments, payroll auction events may be configured to include one or more employers, employed entities and payroll payment inventory. Acts in accord with these embodiments are discussed above with reference to FIG. 10.

In act 1508, a payroll auction event campaign is configured. According to some embodiments, payroll auction event campaigns may be configured to recruit employed entities to participate in payroll auction events. Acts in accord with these embodiments are discussed above with reference to FIG. 11.

In act 1510, the payroll auction event campaign is executed. According to other embodiments, payroll auction event campaigns may be conducted to notify potential bidders, who may be employed entities, of an upcoming payroll auction event. Acts in accord with these embodiments are discussed above with reference to FIG. 12.

In act 1512, the payroll auction event is executed. According to some embodiments, payroll auction events may be conducted to sell payroll payments to multiple employed entities. Acts in accord with these embodiments are discussed above with reference to FIG. 13.

In act 1514, the payroll auction event is analyzed. According to a variety of embodiments, payroll auction events may be analyzed to forecast employed entity behavior in future auctions. Acts in accord with these embodiments are discussed above with reference to FIG. 14.

Process 1500 ends at 1516.

Figure 16:
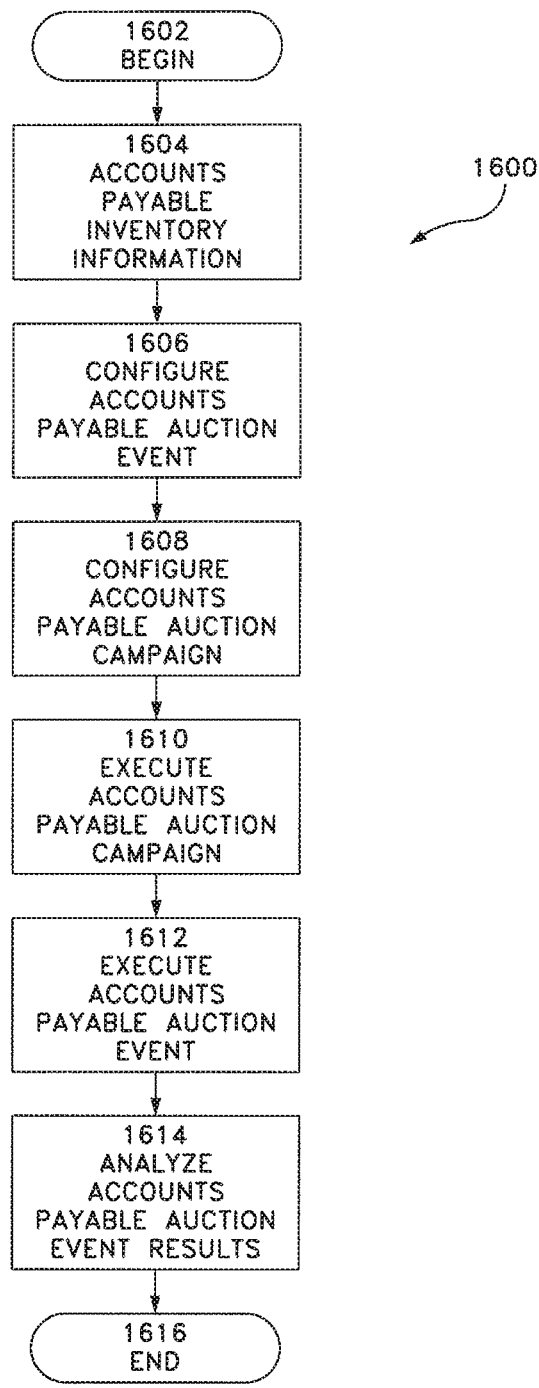
FIG. 16 depicts an example process for conducting and analyzing an auction according to an embodiment.

FIG. 16 illustrates a process 1600 that includes acts of receiving A/P inventory information, configuring an A/P auction event, configuring an A/P auction event campaign, executing the A/P auction event campaign, executing the A/P auction event and analyzing the A/P auction event. Process 1600 begins at 1602.

In act 1604, A/P inventory information is received. According to one embodiment, A/P inventory information may be received by inventory interface 316 and stored in inventory database 332. According to this embodiment, inventory information may be received from an external A/P system.

In act 1606, an A/P auction event is configured. According various embodiments, A/P auction events may be configured to include one or more employers, employed entities and A/P payment inventory. Acts in accord with these embodiments are discussed above with reference to FIG. 10.

In act 1608, an A/P auction event campaign is configured. According to some embodiments, A/P auction event campaigns may be configured to recruit employed entities to participate in A/P auction events. Acts in accord with these embodiments are discussed above with reference to FIG. 11.

In act 1610, the A/P auction event campaign is executed. According to other embodiments, A/P auction event campaigns may be conducted to notify potential bidders, who may be employed entities, of an upcoming A/P auction event. Acts in accord with these embodiments are discussed above with reference to FIG. 12.

In act 1612, the A/P auction event is executed. According to some embodiments, A/P auction events may be conducted to sell A/P payments to multiple employed entities. Acts in accord with these embodiments are discussed above with reference to FIG. 13.

In act 1614, the A/P auction event is analyzed. According to a variety of embodiments, A/P auction events may be analyzed to forecast employed entity behavior in future auctions. Acts in accord with these embodiments are discussed above with reference to FIG. 14.

Process 1600 ends at 1616.

Each of process 900, 1000, 1100, 1200, 1300, 1400, 1500 and 1600 depicts one particular sequence of acts in a particular embodiment. The acts included in each of these processes may be performed by, or using, one or more computer systems specially configured as discussed herein. Thus the acts may be conducted by external entities, such as users or separate computer systems, by internal elements of a system or by a combination of internal elements and external entities. Some acts are optional and, as such, may be omitted in accord with one or more embodiments. Additionally, the order of acts can be altered, or other acts can be added, without departing from the scope of the present invention. In at least some embodiments, the acts have direct, tangible and useful effects on one or more computer systems, such as storing data in a database or providing information to external entities.

Any references to front and back, left and right, top and bottom, and upper and lower are intended for convenience of description, not to limit the present systems and methods or their components to any one positional or spatial orientation.

Any references to embodiments or elements or acts of the systems and methods herein referred to in the singular may also embrace embodiments including a plurality of these elements, and any references in plural to any embodiment or element or act herein may also embrace embodiments including only a single element. References in the singular or plural form are not intended to limit the presently disclosed systems or methods, their components, acts, or elements.

Any embodiment disclosed herein may be combined with any other embodiment, and references to "an embodiment," "some embodiments," "an alternate embodiment," "various embodiments," "one embodiment," "at least one embodiment," "this and other embodiments" or the like are not necessarily mutually exclusive and are intended to indicate that a particular feature, structure, or characteristic described in connection with the embodiment may be included in at least one embodiment. Such terms as used herein are not necessarily all referring to the same embodiment. Any embodiment may be combined with any other embodiment in any manner consistent with the aspects disclosed herein. References to "or" may be construed as inclusive so that any terms described using "or" may indicate any of a single, more than one, and all of the described terms.

Where technical features in the drawings, detailed description or any claim are followed by references signs, the reference signs have been included for the sole purpose of increasing the intelligibility of the drawings, detailed description, and claims. Accordingly, neither the reference signs nor their absence have any limiting effect on the scope of any claim elements.

Having now described some illustrative aspects of the invention, it should be apparent to those skilled in the art that the foregoing is merely illustrative and not limiting, having been presented by way of example only. Similarly, aspects of the present invention may be used to achieve other objectives including allowing users to auction inventory other than payment of trade obligations, such as short term A/P and payroll obligations. For example, according to one embodiment, the inventory auctioned is payment without a corresponding debt, i.e. the inventory is a loan from the seller to the buyer. This embodiment may be particularly well suited for in an embodiment directed toward payroll. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives.

What is claimed:

1. A computer implemented method comprising:

electronically providing an offer to a computer of an authorized bidder to whom a seller owes an obligation, via a network interface over a communications network, the obligation being associated with an available inventory of obligations, wherein the offer is associated with a stated amount for the obligation owed by the seller to the authorized bidder, wherein an auction integration engine enables interoperation between (1) the network interface and a seller auction interface and between (2) the network interface and a bidder interface, via a respective protocol;

electronically receiving, via the network interface over the communications network and until occurrence to a terminating condition, a request in a first communications protocol and submit via the bidder interface on the computer of the authorized bidder, the request associated with a bid including electronic data specifying a bid amount in terms of a discount for the obligation as a portion of the stated amount for the obligation;

electronically converting the request from the first communications protocol to a second communications protocol;

electronically storing a representation of the bid in an auction database;

using a processor coupled to the network interface and a non-transitory computer-readable storage medium, processing the electronic data in the bid and determining an eligibility for acceptance of the bid based at least in part on the bid amount for the obligation; and based on the determined eligibility for acceptance, electronically sending a notification, via the network interface to a seller computer displaying the seller auction interface and the computer of the authorized bidder, indicative of the eligibility for acceptance of the bid, wherein electronically sending the notification causes display of the seller auction interface to change by causing the generation of a first graphical user interface element corresponding to the eligible bid and that is selectable to accept the eligible bid, and wherein selecting the first graphical user interface element to accept the eligible bid comprises updating the obligation based on the bid or the discount for the obligation.

2. The computer implemented method according to claim 1, further comprising receiving, at the processor, a hurdle rate and wherein determining the eligibility for acceptance includes comparing, using the processor, the bid amount associated with each bid to a rate based at least in part on the hurdle rate.

3. The computer implemented method according to claim 1, further comprising:
determining, using the processor, a margin by which the bid is eligible; and
indicating, via the network interface, the representation based at least in part on the margin.

4. The computer implemented method according to claim 1, wherein determining, using the processor, the eligibility for acceptance includes determining a market discount based at least in part on a statistical summary of one or more bid amounts associated with a plurality of bids, wherein the bid is determined to be eligible for acceptance based on the discount being greater than the market discount.

5. The computer implemented method according to claim 1, further comprising receiving, at the processor, an auction goal for a total amount of payment auctioned, and wherein determining the eligibility for acceptance includes determining, using the processor, an eligibility for acceptance of a plurality of bids based at least in part on the auction goal.

6. The computer implemented method according to claim 5, further comprising:
receiving a hurdle rate; and
allocating, using the processor, a portion of the auction goal to any bid of the plurality of bids with a bid amount greater than a rate based at least in part on the hurdle rate.

7. The computer implemented method according to claim 6, further comprising repeating, until the terminating condition occurs, acts comprising:
receiving, via the network interface, a plurality of bids, allocating, using the processor, the portion of the auction goal to any bid of the plurality of bids with a bid amount associated with a greater rate than the hurdle rate,
determining, using the processor, an eligibility for acceptance of multiple bids, and
indicating, via the network interface, the eligibility for acceptance of the multiple bids.

8. The computer implemented method according to claim 7, wherein repeating until the terminating condition occurs, includes repeating until either the allocated portions substantially equal the auction goal or a threshold time is exceeded, the computer implemented method further comprising:
determining, using the processor, after the terminating condition occurs, an eligibility for acceptance of the multiple bids based at least in part on the bid amount of each bid; and
indicating, via the network interface, the eligibility for acceptance of each bid.

9. A system comprising:
a network interface;
one or more processors; and
one or more non-transitory computer-readable storage media having computer-executable instructions embodied thereon that, when executed by the one or more processors, facilitate a method comprising:
electronically providing an offer to a computer of an authorized bidder to whom a seller owes an obligation, via the network interface over a communications network, the obligation being associated with an available inventory of obligations, wherein the offer is associated with a stated amount for the obligation owed by the seller to the authorized bidder, wherein an auction integration engine enables interoperation between (1) the network interface and a seller auction interface and between (2) the network interface and a bidder interface, via a respective protocol;
electronically receiving, via the network interface over the communications network and until occurrence of a terminating condition, a request in a first communications protocol and submit via the bidder interface displayed on the computer of the authorized bidder, the request associated with a bid including electronic data specifying a bid amount in terms of a discount for the obligation as a portion of the stated amount for the obligation;
electronically converting the request from the first communications protocol to a second communications protocol;
electronically storing a representation of the bid in an auction database; and
electronically sending a notification, via the network interface to a seller computer displaying the seller auction interface and the computer of the authorized bidder, indicative of the eligibility for acceptance of the bid, wherein electronically sending the notification causes display of the seller auction interface to change by causing the generation of a first graphical user interface element corresponding to the eligible bid and that is selectable to accept the eligible bid, and wherein selecting the first graphical user interface element to accept the eligible bid comprises updating the obligation based on the bid or the discount for the obligation.

10. The system according to claim 9, further comprising receiving, at the one or more processors, a hurdle rate and wherein determining the eligibility for acceptance includes comparing, using the one or more processors, the bid amount associated with each bid to a rate based at least in part on the hurdle rate.

11. The system according to claim 9, further comprising:
determining, using the one or more processors, a margin by which the bid is eligible; and
indicating, via the network interface, the representation based at least in part on the margin.

12. The system according to claim 9, wherein determining, using the one or more processors, the eligibility for acceptance includes determining a market discount based at least in part on a statistical summary of bid amounts associated with a plurality of bids, wherein the bid is determined to be eligible for acceptance based on the discount being greater than the market discount.

13. The system according to claim 9, further comprising receiving, at the one or more processors, an auction goal for a total amount of payment auctioned and wherein determining the eligibility for acceptance includes determining, using the one or more processors, an eligibility for acceptance of a plurality of bids based at least in part on the auction goal.

14. The system according to claim 13, further comprising:
receiving a hurdle rate; and
allocating, using the one or more processors, a portion of the auction goal to any bid of the plurality of bids with a bid amount greater than a rate based at least in part on the hurdle rate.

15. The system according to claim 14, further comprising repeating, until the terminating condition occurs, acts comprising:
receiving, via the network interface, a plurality of bids,
allocating, using the processor, the portion of the auction goal to any bid of the plurality of bids with a bid amount associated with a greater rate than the hurdle rate,
determining, using the one or more processors, an eligibility for acceptance of multiple bids, and
indicating, via the network interface, the eligibility for acceptance of the multiple bids.

16. One or more non-transitory computer-readable media having computer-executable instructions embodied thereon that, when executed by one or more processors, cause the one or more process to perform operations comprising:
electronically providing an offer to a computer of an authorized bidder to whom a seller owes an obligation, via a network interface over a communications network, the obligation being associated with an available inventory of obligations, wherein the offer is associated with a stated amount for the obligation owed by the seller to the authorized bidder, wherein an auction integration engine enables interoperation between (1) the network interface and a seller auction interface and between (1) the network interface and a bidder interface, via a respective protocol;
electronically receiving, via the network interface over the communications network and until occurrence of a terminating condition, a request in a first communications protocol and submit via the bidder interface on the computer of the authorized bidder, the request associated with a bid including electronic data specifying a bid amount in terms of a discount for the obligation as a portion of the stated amount for the obligation;
electronically converting the request from the first communications protocol to a second communications protocol;
electronically storing a representation of the bid in an auction database;
using the one or more processors coupled to the network interface and the computer-readable storage media, processing the electronic data in the bid and determining an eligibility for acceptance of the bid based at least in part on the bid amount for the obligation; and
based on the determined eligibility for acceptance, electronically sending a notification, via the network interface to a seller computer displaying the seller auction interface and the computer of the authorized bidder, indicative of the eligibility for acceptance of the bid, wherein electronically sending the notification causes display of the seller auction interface to change by causing the generation of a first graphical user interface element corresponding to the eligible bid and that is selectable to accept the eligible bid, and wherein selecting the first graphical user interface element to accept the eligible bid comprises updating the obligation based on the bid or the discount for the obligation.

17. The computer implemented method according to claim 1, further comprising:
receiving, via the seller auction interface, an input indicative of acceptance of the bid; and
based on the acceptance of the bid, updating, on the bidder interface, an event status to reflect the acceptance and an end of the bid.

18. The computer implemented method according to claim 1, wherein determining the eligibility comprises:
comparing (1) the electronic data specifying the bid amount of the bid and (2) the offer associated with the stated amount for the obligation; and
based on the comparison, determining that a value exceeds a threshold associated with the offer.

19. The computer implemented method according to claim 1, wherein the obligation comprises at least one of an account payable or an account receivable.

20. The computer implemented method according to claim 1, further comprising:
determining occurrence of the terminating condition, wherein the occurrence of the terminating condition comprises expiration of a time duration;
based on the determining the occurrence of the terminating condition and based on the updated bid status reflecting eligibility for acceptance, applying the bid amount to the obligation owed by the seller to the authorized bidder; and
updating the available inventory of obligation to reflect the bid amount being applied to the obligation owed by the seller to the authorized bidder.

* * * * *

UNITED STATES PATENT AND TRADEMARK OFFICE
CERTIFICATE OF CORRECTION

PATENT NO. : 12,062,087 B2
APPLICATION NO. : 17/080026
DATED : August 13, 2024
INVENTOR(S) : Alexander C. Kemper et al.

It is certified that error appears in the above-identified patent and that said Letters Patent is hereby corrected as shown below:

In the Claims

Column 35, Line 45, Claim 16:
In the line reading "between (1) the network interface and a bidder inter-" should read -- between (2) the network interface and a bidder inter- --

Signed and Sealed this
Seventeenth Day of September, 2024

Katherine Kelly Vidal
*Director of the United States Patent and Trademark Office*